United States Patent Office 3,442,795
Patented May 6, 1969

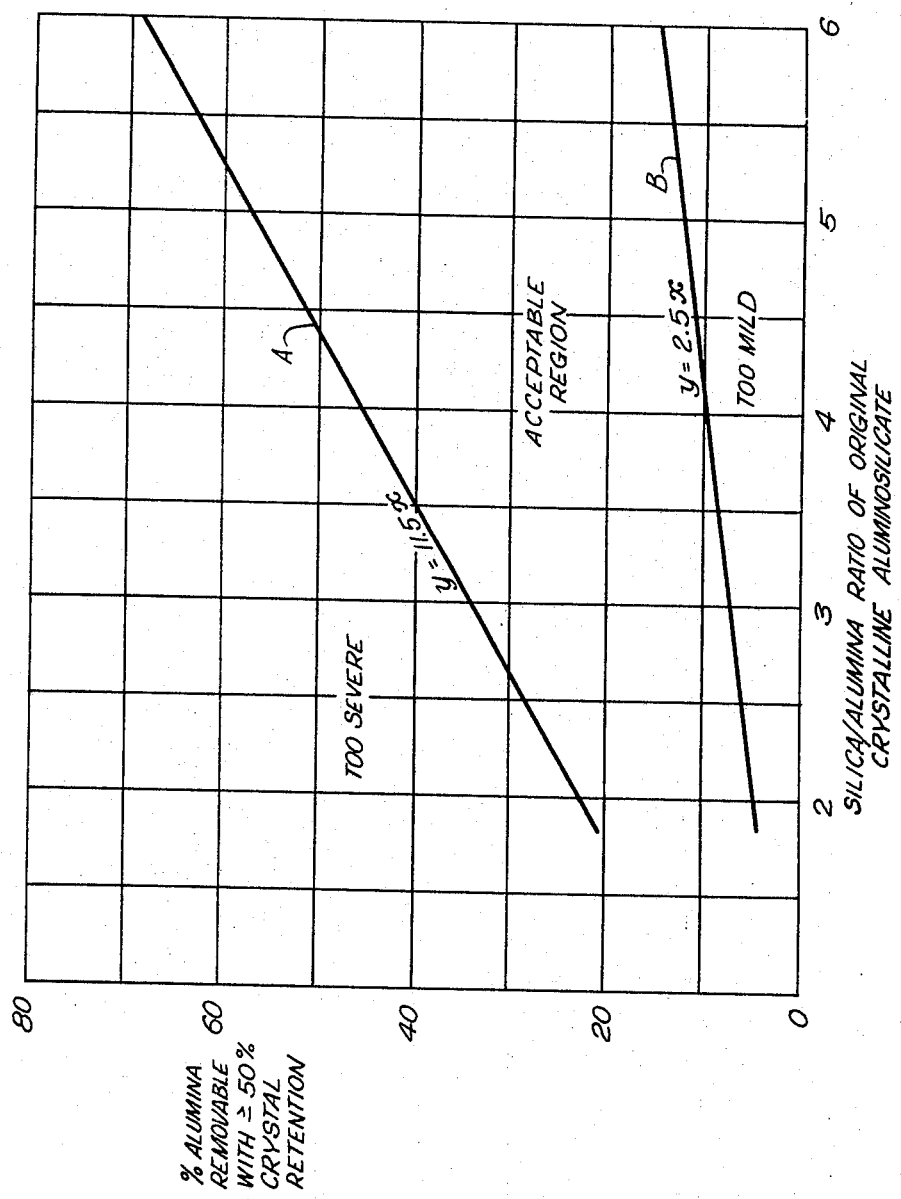

3,442,795
METHOD FOR PREPARING HIGHLY SILICEOUS
ZEOLITE-TYPE MATERIALS AND MATERIALS
RESULTING THEREFROM
George T. Kerr, Trenton, Charles J. Plank, Woodbury,
and Edward J. Rosinski, Deptford, N.J., assignors to
Mobil Oil Corporation, a corporation of New York
Continuation-in-part of application Ser. No. 261,494,
Feb. 27, 1963. This application Oct. 11, 1965, Ser.
No. 494,846
Int. Cl. C10g 13/02
U.S. Cl. 208—120                             46 Claims This application is a continuation-in-part of our copending application Ser. No. 261,494 filed Feb. 27, 1963 and now abandoned.

This invention relates to a method of preparing highly siliceous crystalline zeolite-type materials and materials resulting therefrom and, more particularly, to a novel technique for increasing the silica to alumina ratio of zeolites and to the zeolites or zeolite-type material resulting therefrom.

Zeolitic materials, both natural and synthetic, have been demonstrated in the past to have catalytic capabilities for various types of hydrocarbon conversion. Certain zeolitic materials are ordered crystalline aluminosilicates having a definite crystalline structure within which there are a large number of small cavities which are interconnected by a number of still smaller holes or channels. These cavities and channels are uniform in size. Since the dimensions of these pores are such as to accept for adsorption molecules of certain dimensions while rejecting those of larger dimensions, these materials have come to be known as 'molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as Ca, Sr, $Na_2$, $K_2$ or $Li_2$, is equal to unity. One cation may be exchanged either in entirety or partially by another cation utilizing ion exchange techniques as discussed hereinbelow. By means of such cation exchange, it is possible to vary the size of the pores in the given aluminosilicate by suitable selection of the particular cation. The spaces between the tetrahedra are occupied by molecules of water prior to dehydration. The parent zeolite is dehydrated to activate it for use as a catalyst.

A description of such zeolites is found in Patents 2,882,243, 2,971,824, 3,033,778 and 3,130,007, whose disclosures are hereby incorporated herein by reference.

The stability of the exchanged crystalline aluminosilicates in the presence of heat, steam and acid, as well as their catalytic properties in general, are to a great extent dependent upon the silica/alumina ratio in the crystal lattice of the aluminosilicate. Generally speaking, the higher the silica/alumina ratio in the aluminosilicate, the greater the stability to heat, steam and acid.

In synthetic aluminosilicates, the silica/alumina ratio is essentially determined by the specific materials and the relative quantities of such materials used in the preparation of the zeolite. Naturally occurring zeolites are available, of course, with a fixed silica/alumina ratio. At the present time, no truly effective technique is known to alter drastically the silica/alumina ratio in natural crystalline aluminosilicates or in synthetic crystalline aluminosilicates after the later have been formed. Since in many respects it would be advantageous to be able to convert an existing crystalline aluminosilicate to a crystalline material having a greater silica/alumina ratio, the desirability of a process which would make such conversion feasible from an economical and chemical standpoint would, quite obviously, be greatly desirable.

In accordance with the present invention, it has now been found, for the first time, that it is possible to change drastically the silica/alumina ratio in crystalline aluminosilicates, modify their crystalline character to result in a shift to shorter metal-oxygen interatomic distances (measured as lattice cell constant, $a_0$) yet, at the same time, to obtain an improved zeolite or zeolite-like material having one or more enhanced catalytic properties. In accordance with the present invention, it is also possible to accomplish the same results with isomorphs of crystalline aluminosilicates.

It is accordingly a primary object of the present invention to provide a novel and effective process for increasing the silica/alumina ratio of crystalline aluminosilicates.

It is another important object of the present invention to provide a novel and effective process for the selective removal of aluminum from crystalline aluminosilicates by means of a solvolysis technique.

It is another important object of the present invention to provide a novel and effective process for the selective removal of aluminum from crystalline aluminosilicates by means of a hydrolysis technique.

It is a further object of the present invention to provide a novel and effective process for the selective removal of aluminum from crystalline aluminosilicates by means of a combined solvolysis-chelation technique.

It is a further object of the present invention to provide a process for the selective removal of aluminum by means of molecules or ions which can complex strongly with trivalent aluminum to form aluminum complexes which may be removed from the aluminum-deficient aluminosilicate.

It is still another important object of the present invention to provide a novel process for obtaining a significant increase in the silica/alumina ratio of crystalline aluminosilicates, which process is capable of improving stability of such aluminosilicates to heat, steam and acid without excessive loss in crystallinity, while providing aluminosilicates with improved catalytic properties including in many cases an increase in sorptive capacity.

It is another object of the present invention to provide a process capable of increasing the silica/alumina ratio in crystalline aluminosilicates up to 50/1 or higher by means of a novel chelation technique, said novel technique permitting the use of starting materials having a silica/alumina ratio lower than about 6/1 and even as low as about 2/1.

These and other important objects and advantages of the present invention will become more apparent upon reference to the ensuing description, appended claims and drawing wherein:

The single figure is a graph representing the silica/alumina ratio of the original aluminosilicate plotted against percent alumina removable with ≧50% crystal retention.

In accordance with the present invention, the silica/alumina ratio of crystalline aluminosilicates may be significantly increased to form more useful catalytic composites by treating such aluminosilicates to remove part of the aluminum atoms in their anionic structure. Such removal is effected by a combined solvolysis-chelation technique to be described in greater detail below.

In order to remove aluminum effectively from the crystalline aluminosilicate, it is essential that the aluminum first be removed from the tetrahedral sites in the anionic crystal lattice of the aluminosilicate. In accordance with the present invention, this step is effectuated through the formation of a hydrogen or acid zeolite and the subsequent solvolysis of the acid zeolite. More specifically, a portion of the cation of the zeolite must at some point be hydrogen. It is the solvolysis of those aluminum sites associated with such hydrogen ions which causes the zeolite to lose aluminum from the zeolitic framework.

Having removed aluminum from the tetrahedral sites of the aluminosilicate, the next problem is to separate this aluminum physically from the aluminosilicate (assuming such separation is desired). In accordance with the present invention, this may truly effectively be accomplished by means of a suitable complexing agent to complex the aluminum into a form which facilitates its separation from the aluminosilicate. As will be apparent from the ensuing description, while maximum effectiveness of the process of the present invention is obtained when such physical separation is effected, it is within contemplation of the present invention to effect aluminum removal from the tetrahedral sites with either partial or no physical separation of said aluminum from the aluminosilicate.

The several aspects of the present invention will best be understood by first broadly postulating the theory which it is understood is involved in the practice of the present invention and then following such postulated theory with a discussion setting forth specific applications of such theory.

Following the formation of the hydrogen or acid form of the zeolite (the specific methods of effecting which will be discusssed hereinafter), the aluminum must be removed from the tetrahedral sites in the aluminosilicate. While the present invention is not so limited, this removal is effectively illustrated by reference to the use of a hydrolysis technique for such purpose. Upon the reaction of the acid zeolite with water, the hydrolysis is postulated as proceeding as follows:

$$H(AlO_2)(SiO_2)_x + 3H_2O \rightarrow (H_4O_2)(SiO)_x + Al(OH)_3$$

In the above equation, $(H_4O_2)$ represents the tetrahedral structure of the zeolite which experimental data indicates is formed following the hydrolysis. The initial tetrahedral structure (before hydrolysis) may be represented as follows:

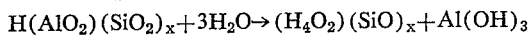

During hydrolysis, it is postulated that the aluminum ion in the tetrahedra is replaced by four protons, as follows:

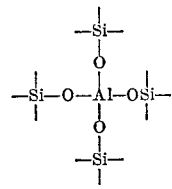

Thus, the $(H_4O_2)$ represents the four protons contained in the oxygen tetrahedron set forth above. These formulae will be alluded to at a later point in this specification since this structure is extremely pertinent to an essential aspect of the present invention.

The above discussion may be used to explain not only the phenomena involved in the use of a hydrolysis technique to effect aluminum removal from the tetrahedral sites in the aluminosilicate but the use of solvolysis agents broadly for this purpose, hydrolysis merely being a highly preferred technique for the practice of the present invention. Thus, merely by way of example, this discussion is also generally applicable to other solvolysis techniques, such as alcoholysis, ammonolysis, or the like.

As previously indicated, while the solvolysis reaction suffices to remove aluminum from the tetrahedral sites of the aluminosilicate (the degree of solvolysis depending upon the amount of aluminum removal desired), it is still necessary to separate this aluminum physically from the aluminosilicate if the latter is desired. In accordance with the present invention, en extremely effective technique for such separation involves the use of complexing or chelating agents to form aluminum complexes which are readily removable from the aluminosilicate proper.

An extremely effective method of removing aluminum from the aluminosilicate with a minimum of effort and procedural steps involves the use of complexing agents which are effective not only to separate the aluminum physically from the aluminosilicate but to convert the aluminosilicate to its hydrogen or acid form prior to such separation, thus obviating the requirement for a preliminary acidification step. This procedure, which forms an essential aspect of the present invention, may best be explained in terms of the various reactions which take place when such a complexing agent is employed. For purposes of simplification of such explanation, the series of equations in question will be set forth in terms of a calcium form of aluminosilicate and a quaternary ammonium chelating agent. The specific quaternary ammonium chelating agent will be represented by the compound di(tetraethylammonium) dihydrogen ethylenediaminetetraacetate. (Note: When used in this specification, EDTA will represent ethylenediaminetetraacetic acid; when EDTA is set forth as part of a larger compound, viz., as the EDTA radical, it will represent the ethylenediaminetetraacetate radical.)

Having defined the reactants, the following equations apparently satisfactorily illustrate the use of a complexing agent not only to separate the aluminum physically from the aluminosilicate but to acidify such aluminosilicate prior to such physical separation:

(1) $Ca_{1/2}[(AlO_2)(SiO_2)_x]$
$+y[(C_2H_5)_4N]_2H_2EDTA \rightarrow$
$Ca_{(1/2-y)}H_{2y}[(AlO_2)(SiO_2)_x]$
$+y[(C_2H_5)_4N]_2CaEDTA$ (2) $Ca_{(1/2-y)}H_{2y}[AlO_2)(SiO_2)_x]+3zH_2O \rightarrow Ca_{(1/2-y)}$
$H_{(2y-z)}[(AlO_2)_{(1-z)}(H_4O_2)_z(SiO_2)_x]+zAl(OH)_3$ (3) $zAl(OH)_3+z[(C_2H_5)_4N]_2EDTA \rightarrow$
$z[(C_2H_5)_4N]AlEDTA+z[(C_2H_5)_4N]OH+2zH_2O$ (4) $Ca_{(1/2-y)}H_{(2y-z)}[(AlO_2)_{(1-z)}(H_4O_2)_z(SiO_2)_x]$
$+2y-z[(C_2H_5)_4N]OH \rightarrow$
$Ca_{(1/2-y)}[(C_2H_5)_4N]_{(2y-z)}$
$[(AlO_2)_{(1-z)}(H_4O_2)_z(SiO_2)_x]+2y-zH_2O$ In the above equations, $x>2.0$; $y$ represents moles of $Ca^{++}$ removed from the zeolite; and $z$ represents moles of $AlO_2^-$ removed from the zeolite.

As will be seen from the above series of equations, the foregoing process takes place in a series of four stages. In the first stage, the zeolite undergoes attack by the hydrogen ions of the chelating agent with such hydrogen ions being substituted for at least a portion of the cations of the zeolite. In the second stage, the acid zeolite formed in the first stage solvolyzes to form a compound deficient in alumina. At this point in the process, the aluminum which has been removed from the tetrahedral sites of the aluminosilicate is still physically present on the aluminosilicate. In the third stage of the process, the aluminum hydroxide formed in the second stage reacts with excess of the chelating agent to form a quaternary ammonium hydroxide and an aluminum chelate. Finally, in the fourth and last stage of the process, the quaternary ammonium hydroxide reacts with the hydrolyzed acid zeolite formed in the second stage of the process to form the quaternary ammonium form of the alumina-deficient zeolite.

In view of the significant advantages of the procedure described immediately above in using a complexing agent which not only effects physical removal of the aluminum from the aluminosilicate but effects the initial acidification of the aluminosilicate, it is obviously desirable to use such technique whenever possible. While such technique may be effectively carried out with a number of specific aluminosilicates utilizing a large variety of complexing agents (as shown, merely by way of illustration, in Examples 1–19), however, there are situations in which, for one reason or another, it is not possible to follow this simplified procedure. For example, when a disodium dihydrogen EDTA chelating agent is used to treat a sodium zeolite Y aluminosilicate for purposes of removing alumina, without preliminary acidification of the zeolite, it will be found that no significant quantity of alumina is removed. The reason for this is that disodium dihydrogen EDTA is exceedingly weak as an acid and does not provide enough acidity to convert the sodium zeolite Y into its acid form. Since, as indicated previously, it is necessary that the zeolite be in its acid form so as to undergo solvolysis before the complexing agent will be effective to remove aluminum physically from the aluminosilicate, it will be apparent that the silica/alumina ratio of the aluminosilicate may not be increased by the above technique utilizing the zeolite and chelating agent in question.

On the other hand, where disodium dihydrogen EDTA is used to remove alumina from calcium zeolite Y without the preliminary acidification of the zeolite, the treatment is fairly effective in removing alumina without any loss in sorptive capacity (see Example 1). The reason for the effectiveness of the disodium dihydrogen EDTA in this case is that the complex which is formed by the calcium ion and the chelating agent is so stable that the disodium dihydrogen EDTA is willing to sacrifice its two weak hydrogens to pick up the calcium ion, this great stability of the calcium complex providing the potential to cause the reaction to proceed as it does. Thus, where calcium zeolite Y is concerned, a chelating agent such as disodium dihydrogen EDTA may be effectively utilized for the purpose of removing alumina from the zeolite.

But notwithstanding the inability of the disodium dihydrogen EDTA to remove alumina from a compound such as sodium zeolite Y without preliminary acidification of the zeolite, the broad essence of the present invention is nevertheless applicable to such a system to effect the removal of the alumina from the zeolite. More specifically, all that need be done in such case is to pretreat the zeolite to convert it at least partially to its acid or hydrogen form and to solvolyze such acid zeolite, followed by subsequent treatment with a complexing agent (which may be disodium dihydrogen EDTA) to separate the aluminum physically from the aluminosilicate. Such a procedure is clearly illustrated in Example 41. In this technique, however, it is important to note that the complexing agent in such case is used simply to chelate or complex the aluminum but is not relied upon in any way to provide the acid zeolite which is necessary before such chelation takes place.

In those instances in which the complexing agent is to be used not only to effect physical removal of the aluminosilicate but to effect the initial acidification of the aluminosilicate, it is necessary, as will be appreciated from the foregoing discussion, to use a hydrogen ion-containing complexing agent whose hydrogen ions will exchange into the particular aluminosilicate being treated. In general, it may be stated that most effective results are obtained when a complexing agent is employed which will bring the pH of the reaction mixture below about 7 and preferably about 6 at least at some point during the reaction. This desideratum may be obtained most effectively when the pH of the complexing agent employed is no greater than about 6. By using complexing agents of at least this degree of acidity, the reaction potential will ordinarily be sufficiently great to cause the hydrogen ions of such agent to exchange into the aluminosilicate.

On the other hand, it should be noted that one of the significant advantages of using complexing agents which not only are effective to remove the aluminum from the solvolyzed aluminosilicate but to convert the aluminosilicate to its acid form is that such complexing agents permit highly controlled rates of formation of the hydrogen or acid zeolite and, at the same time, a controlled rate of solvolysis of said acid zeolite. Consistent with this significant advantage, it is important to consider that negative results can be obtained if the pH of the complexing agent is too low, in which case the high degree of control provided by such complexing agent may be lost. Even here, however, the acidity which the aluminosilicate can tolerate will depend to a great degree upon the silica/alumina ratio of the starting material. With high silica/alumina ratios such as exist in mordenite, high acidity can be tolerated. On the other hand, where lower silica/alumina ratios are involved, such as exist in synthetic faujasite, more care must be taken to avoid uncontrolled acid attack on the zeolite and, accordingly, higher pH's are preferred in such case. The true beauty of the process of the present invention is, of course, that where complexing agents are used which not only physically remove the alumina from the solvolyzed aluminosilicate but serve to acidify the aluminosilicate in the first instance, the high degree of control provided permits the treatment of aluminosilicates which have silica/alumina starting ratios lower than about 6/1 and even as low as 2/1 without danger of destruction of the aluminosilicate crystal lattice, though most effective results are obtained using aluminosilicates which have initial silica/alumina ratios of about 4 to 1 or more.

Consistent with the foregoing limitations, the pH of the complexing agent utilized in the present invention should be maintained at a level such as to avoid uncontrolled acid attack on the zeolite and the resultant undue loss of zeolite crystallinity. Generally speaking, the pH of the complexing agent should be greater than about 4 (preferably greater than 4.5) where the silica/alumina ratio of the starting material is less than about 3 and should be greater than about 3 where the silica/alumina ratio of the starting material is 3 or more. By adhering to such pH limitations, the loss in crystallinity of the aluminosilicate being treated will not exceed the 50% level (where more than 50% of the crystallinity of the aluminosilicate is destroyed, the essential worth of the aluminosilicate as a catalyst is unduly impaired) for substantially the entire range of crystalline aluminosilicates forming the subject matter of the present invention, provided of course that the amount of acid treatment is maintained within reasonable limits. (See Example 13 where, though the foregoing pH limitations were observed, the treatment was overextended resulting in a loss in crystallinity of greater than 50%.) At pH's below the foregoing levels, the rate of removal of alumina from the crystal lattice tends to be too rapid and non-homogeneous, resulting in substantial danger of undue destruction of the crystallinity of the aluminosilicate.

["Crystallinity," when used in the specification and claims, is measured by comparing the X-ray diffraction spectra of the treated product with that of the zeolite starting material, both such product and starting material having been calcined in air at 1000° F. The relative crystallinity is measured by comparing the area under the peaks of greatest intensity and represents the average ratios of the areas under corresponding peaks for the materials being compared. This way be stated in the form of the equation:

$$\frac{A_{tm}}{A_{sm}} \times 100 = \% \text{ crystallinity}$$

wherein $A_{tm}$ represents the total area under the most intense peaks for the treated material, and $A_{sm}$ represents the total area under the corresponding peaks for the starting material.]

As above stated, treatment of the crystalline aluminosilicate to effect an increase in the silica/alumina ratio of the aluminosilicate through selected alumina removal should be controlled in a manner such that at least 50% of the crystallinity of the starting aluminosilicate remains intact following the treatment. In addition to expressing a limitation on the extent of aluminosilicate treatment in terms of percent crystallinity, it is desirable to impose a limitation on alumina removal in terms of the maximum amount of alumina removed from the crystal lattice as a function of the silica/alumina ratio of the starting material. More specifically, experimental data has indicated that if one plots the maximum amount of alumina that can be removed from the crystal lattice without an excessive loss of crystallinity as a function of the silica/alumina ratio of the starting material, a substantially linear curve results, the equation for which is $$y = 11.5x$$

wherein $y$ represents the percentage of alumina removed, and
$x$ represents the silica/alumina ratio of the starting material.

This curve is identified by the letter A in the drawing. So long as one operates in the area below the curve represented by the above equation, the advantages of the present invention are obtained without the resulting disadvantages resulting from too great a loss of crystallinity of the aluminosilicate. On the other hand, the present invention does not at the other extreme contemplate a de minimus situation in which only a negligible amount of alumina is removed. With this in mind, a curve representing the lower limit of operation can be set forth as $$y = 2.5x$$

wherein $y$ and $x$ have the same values as stated above. (This curve is identified by the letter B in the drawing.) Thus, best results are obtained in accordance with the present invention by operating in the area between the two curves set forth above.

In those instances where, due to the specific nature of the aluminosilicate and the complexing agent (as described above) it is not possible to effect the acidification of the aluminosilicate during the course of the complexing procedure, the aluminosilicate may be pretreated to put it in acid form to the desired degree of acidification. To accomplish such acidification, the aluminosilicate may be contacted with a non-aqueous or aqueous fluid medium comprising a gas, polar solvent or water solution containing the desired ions, such ions being introduced by means either of a hydrogen ion-containing fluid medium or a fluid medium containing ammonium ions capable of conversion to hydrogen ions (the latter procedure having been used in the process of Example 41).

Water is the preferred medium for reason of economy and ease of preparation in large scale operations involving continuous or batchwise treatment, similarly, for this reason, organic solvents are less preferred but can be employed providing the solvent permits ionization of the acid or the ammonium compound. Typical solvents include cyclic and acyclic ethers such as dioxane, tetrahydrofuran, ethyl ether, diethyl ether, diisopropyl ether, and the like; ketones such as acetone and methyl ethyl ketone; esters such as ethyl acetate, propyl acetate; alcohols such as ethanol, propanol, butanol, etc.; and miscellaneous solvents such as dimethylformamide, and the like.

The hydrogen ion or ammonium ion may be present in the fluid medium in an amount varying within wide limits dependent upon the pH value of the fluid medium. Generally speaking, however, the pH minima previously recited in connection with the use of a complexing agent which is effective both to remove the aluminum from the solvolyzed aluminosilicate and to convert the aluminosilicate to its acid form are applicable to the separate treatment with a fluid medium to acidity the aluminosilicate. That is to say, the pH of the fluid medium should be greater than 4 where the silica/alumina ratio of the starting material is less than about 3 and should be greater than about 3 where the silica/alumina ratio of the starting material is 3 or more. By adhering to such pH limitations, the loss in crystallinity of the aluminosilicate being treated will not exceed the 50% level for substantially the entire range of crystalline aluminosilicates forming the subject matter of the present invention, provided again that the amount of acid treatment is maintained within reasonable limits. And, as was the case with the use of the complexing agents as previously described, treatment of the starting material with such fluid medium should be regulated so that alumina removal is within the limits established by the two curves ($y=11.5x$ and $y=2.5x$) previously set forth.

In carrying out the treatment with fluid medium, the procedure employed comprises contacting the aluminosilicate with the desired fluid medium or media until such time as metallic cations originally present in the aluminosilicate are removed to the desired extent. Repeated use of fresh solutions of the entering ion is of value to secure more complete exchange. The degree of exchange will, of course, depend on the amount of aluminum one wants to remove, the greater the degree of acidification of the aluminosilicate the greater the aluminum removal as a general rule.

Elevated temperatures tend to hasten the speed of treatment whereas the duration thereof varies inversely with the concentration of the ions in the fluid medium. In general, the temperatures employed range from below ambient room temperature of 24° C. up to temperatures below the decomposition temperature of the aluminosilicate. Following the fluid treatment, the treated aluminosilicate is washed with water, preferably distilled water, until the effluent wash water has a pH value of wash water, i.e., between about 5 and 8. The aluminosilicate material is thereafter analyzed for metallic ion content by methods well known in the art. Analysis also involves analyzing the effluent wash for anions obtained in the wash as a result of the treatment, as well as determination of and correction for anions that pass into the effluent wash from soluble substances or decomposition products of insoluble substances which are otherwise present in the aluminosilicate as impurities.

The actual procedure employed for carrying out the fluid treatment of the aluminosilicate may be accomplished in a batchwise or continuous method under atmospheric, subatmospheric or superatmospheric pressure. A solution of the ions of positive valence in the form of a molten material, vapor (i.e., steam), aqueous or non-aqueous solution, may be passed slowly through a fixed bed of the aluminosilicate. If desired, hydrothermal treatment or a corresponding non-aqueous treatment with polar solvents may be effected by introducing the aluminosilicate and fluid medium into a closed vessel maintained under autogeneous pressure. Similarly, treatments involving fusion or vapor phase contact may be employed providing the melting point or vaporization temperature of the acid or ammonium compound is below the decomposition temperature of the aluminosilicate.

A wide variety of acidic compounds can be employed with facility as a source of hydrogen ions and include both inorganic and organic acids, so long as the solution pH is not below the level previously indicated.

Representative inorganic acids which can be employed include acids such as hydrochloric acid, hypochlorous acid, chloroplatinic acid, sulfuric acid, sulfuorous acid, hydrosulfuric acid, peroxydisulfonic acid ($H_2S_2O_8$), peroxymonosulfuric acid ($H_2SO_5$), dithionic acid ($H_2S_2O_6$), sulfamic acid ($H_2NHS_3H$), amidodisulfonic acid $$[NH(SO_3H)_2],$$

chlorosulfuric acid, thiocyanic acid, hyposulfuorous acid ($H_2S_2O_4$), pyrosulfuric acid ($H_2S_2O_7$), thiosulfuric acid ($H_2S_2O_3$), nitrosulfonic acid ($HSO_3 \cdot NO$), hydroxylamine disulfonic acid ($(HSO_3)_2 NOH]$, nitric acid, nitrous acid, hyponitrous acid, carbonic acid and the like.

Typical organic acids which find utility in the practice of the invention include the monocarboxylic, dicarboxylic and polycarboxylic acids which can be aliphatic, aromatic or cycloaliphatic in nature.

Representative aliphatic monocarboxylic, dicarboxylic and polycarboxylic acids include the saturated and unsaturated, substituted and unsubstituted acids such as formic acid, acetic acid, chloroacetic acid, dichloroacetic acid, trichloroacetic acid, bromoacetic acid, propionic acid, 2-bromopropionic acid, 3-bromopropionic acid, lactic acid, n-butyric acid, isobutyric acid, crotonic acid, n-valeric acid, isovaleric acid, n-caproic acid, oenanthic acid, pelargonic acid, capric acid, undecyclic acid, lauric acid, myristic acid, palmitic acid, stearic acid, oxalic acid, malonic acid, succinic acid, qlutaric acid, adipic acid, pimelic acid, suberic acid, azelaic acid, sebacic acid, alkylsuccinic acid, alkenylsuccinic acid, maleic acid, fumaric acid, itaconic acid, citraconic acid, mesaconic acid, glutonic acid, muconic acid, ethylidene malonic acid, isopropylidene malonic acid, allyl malonic acid.

Representative aromatic and cycloaliphatic monocarboxylic, dicarboxylic and polycarboxylic acids include 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, 1,8-naphthalenedicarboxylic acid, 1,2-naphthalenedicarboxylic acid, tetrahydrophthalic acid, 3-carboxycinnamic acid, hydrocinnamic acid, pyrogallic acid, benzoic acid, ortho, meta and para-methyl, hydroxyl, chloro, bromo and nitro-substituted benzoic acids, phenylacetic aicd, mandelic acid, benzylic acid, hippuric acid, benzenesulfonic acid, toluenesulfonc acid, methanesulfonic acid and the like.

Other sources of hydrogen ions include carboxy polyesters prepared by the reaction of an excess of polycarboxylic acid or an anhydride thereof and a polyhydric alcohol to provide pendant carboxyl groups.

Still other materials capable of providing hydrogen ions are ion exchange resins having exchangeable hydrogen ions attached to base resins comprising cross-linked resinous polymers of monovinyl aromatic monomers and polyvinyl compounds. These resins are well known materials which are generally prepared by copolymerizing in the presence of a polymerization catalyst one or more monovinyl aromatic compounds, such as styrene, vinyl toluene, vinyl xylene, with one or more dinvyl aromatic compounds such as divinyl benzene, divinyl toluene, divinyl xylene, divinyl naphthalene and divinyl acetylene. Following copolymerization, the resins are further treated with suitable acids to provide the hydrogen form of the resin.

Still anothre class of compounds which can be employed are ammonium compounds which decompose to provide hydrogen ions when an aluminosilicate treated with a solution of said ammonium compound is subjected to temperatures below the decomposition temperature of the aluminosilicate.

Representative ammonium compounds which can be employed include ammonium chloride, ammonium bromide, ammonium iodide, ammonium crabonate, ammonium bicarbonate, ammonium sulfate, ammonium sulfide, ammonium thiocyanate, ammonium dithiocarbamate, ammonium peroxysulfate, ammonium acetate, ammonium tungstate, ammonium molybdate, ammonium benzoate, ammonium borate, ammonium carbamate, ammonium sesquicarbonate, ammonium chloroplumbate, ammonium citrate, ammonium dithionate, ammonium fluoride, ammonium gallate, ammonium nitrate, ammonium nitrite, ammonium formate, ammonium propionate, ammonium butyrate, amonium valerate, ammonium lactate, ammonium malonate, ammonium oxalate, ammonium palmitate, ammonium tartrate and the like. Still other ammonium compounds which can be employed include complex ammonium compounds such as tetramethylammonium hydroxide, trimethylammonium chloride. Other compounds which can be employed are nitrogen bases such as the salts of quanidine, pyridine, quinoline, etc.

An essential feature of the present invention is that by a judicious choice of the complexing agent which is used to remove the aluminum physically from the aluminosilicate following the solvolysis reaction, such removal may be greatly facilitated. More specifically, if a complexing agent is selected which forms a soluble complex or chelate with the metal cations which are removed from the aluminosilicate, the physical separation of the aluminum from the aluminosilicate will simply involve the removal (by filtration) of the resulting solution from the solid aluminosilicate. Restating the foregoing in terms of the four-stage process previously discussed, if the complex $[(C_2H_5)_4N]Al$-ETDA is soluble in aqueous solution, separation problems will have been virtually eliminated since the treated aluminosilicate is insoluble in water. Specific examples of such a procedure include (merely by way of illustration) Examples 1–19, in each of which a complex chelate is formed which is water soluble.

It is to be understood, however, that the above solubility characteristic, while forming an inventive feature of the present application and while extremely desirable, can be eliminated without detracting from the broad inventive concept which has previously been discussed. More specifically, as will be shown in Example 42, it is possible to remove the aluminum physically from the aluminosilicate without dissolving it by use of a chelating resin which may be physically separated from the aluminosilicate product by means of a conventional screening process, since the resin beads are relatively large compared to the treated zeolite, which has dimensions in the order of microns. It will be noted from Example 42, however, that notwithstanding the fact that the aluminum removed from the aluminosilicate is not solubilized, the chelating resin is nevertheless usable to form the acid zeolite as a preliminary to the aluminum removal, at least in the case of the calcium zeolite Y which was used in said example. Thus, the significant advantages of the present invention are retained notwithstanding the different technique of removal of the aluminum from the aluminosilicate.

As will be apparent, a variety of complexing agents may be used to remove the aluminum from the solvolyzed zeolite within the framework of the present invention, the essential requirement being that such agents must form coordination complexes with aluminum. The preferred complexing agents are those which form stable chelates with aluminum. In the case of a complexing agent which is intended to form soluble complexes or chelates for ease of removal of the aluminum from the aluminosilicate, the complexing agent should form a stable complex or chelate with aluminum which is soluble in the medium in which the complexing is carried out. When the complexing agent is to be used to acidify the aluminosilicate prior to complexing, the complexing agent should also exist initially either in its acid form or as an acid salt, should form a stable complex or chelate with at least one cation present in the zeolite to be treated and should have a pH in solution no greater than about 7 and preferably no greater than about 6. In all cases, the complexing agent should be so selected that complexing takes place slowly enough to avoid destruction of the crystalline, aluminum-deficient, zeolite product. As previously indicated, this goal is best effectuated by limiting the degree of acidity of the complexing agent, so that the aluminosilicate being treated will not exhibit a loss in crystallinity of greater than 50%.

In those cases where the complexing agent is also to be used to convert the aluminosilicate to its hydrogen or acid form, the complexing agent should preferably be so selected that the non-hydrogen cation of the complexing agent is sufficiently large so that it will not exchange into the aluminosilicate. By means of such size selection, the non-hydrogen cations of the complexing agent will not compete for the available cation sites in the aluminosilicate with the hydrogen ions and prevent effective acidification of the aluminosilicate, which acidification must take place for the effective alumina removal of the present invention. Extremely effective complexing agents for this purpose are those containing tetraethylammonium cations such as those previously mentioned.

Examples of complexing agents which are extremely effective in carrying out the process of the present invention include (but are not restricted to) di(tetraethylammonium) dihydrogen EDTA; EDTA (ethylenediaminetetraacetic acid); diammonium dihydrogen EDTA; ammonium acid manganese EDTA; fluorides, such as sodium or ammonium fluoride; carboxylic and polycarboxylic acids and acid salts, such as citric acid and ammonium acid citrate; mixtures of such complexing agents; etc. An example of the type of complexing agent which does not form a soluble complex is a complexing resin which contains an iminodiacetate functional group.

Various other complexing agents, containing a variety of anionic portions, may also be used in the process of the present invention provided they meet the criteria set forth hereinbefore. For a comprehensive review of complexing agents, see "Organic Sequestering Agents" by Stanley Chaberek and Arthur E. Martell, published by John Wiley and Sons, Inc., New York (1959), and an article entitled "Chelation" by Harold F. Walton, Scientific American, June 1953, pp. 68–76, both of which are hereby incorporated by reference.

In general, complexing should preferably take place at temperatures of about 20–100° C. for periods of at least 2 hours. Extended periods of reaction are normally not detrimental and, in some cases, could be desirable.

The zeolites which may be treated in accordance with the present invention may, in their hydrated form, be represented by the following formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$ and $y$ the moles of $H_2O$, the removal of which produces the characteristic open network system of the molecular sieves.

Cation M should preferably form a stable chelate with the chelating agent to be used in the process of the present invention. For example, excellent results have been obtained in light of the foregoing requirement wherein cation M is calcium or one of the rare earth metals, etc. Excellent results have also been obtained with other cations, i.e., sodium.

As indicated previously, the $SiO_2$:$Al_2O_3$ ratio (viz., the value of $w$) should be at least about 2:1 initially, and preferably at least 4:1. Indeed, particularly excellent results are obtained with ratios above about 4:1 and less than about 6:1. As a result of the present process, zeolites or zeolitic-like products may be obtained having a silica-alumina ratio as high as 50/1, if not higher.

The particular zeolite which is utilized in the process of the present invention should be capable of accommodating at least one cation (viz., M) which forms a stable complex or chelate with the complexing agent utilized in the process and should also be capable of undergoing limited attack by hydrogen ions which results in the loss of at least a portion of its alumina. Particularly advantageous zeolites meeting these qualifications (although this list is not intended to be exhaustive) include zeolites of the following groups: X; B; D; L; Q; R; S; T; Y; Z; ZK–4; ZK–5; and natural zeolitic materials such as faujasite; heulandite; clinoptilolite; chabazite, gmelinite mordenite; dachiardite; etc.

Following is a description of exemplary zeolites usable in the process of the present invention:

Zeolite X is a synthesized crystalline aluminosilicate which can be represented in terms of mole ratios of oxides as follows:

$$1.0\pm0.2M_{2/n}O:Al_2O_3:2.5\pm0.5SiO_2:yH_2O$$

wherein M is a cation as hereinbefore defined, $n$ represents the valence of M, and $y$ is a value up to eight depending on the identity of M and degree of hydration of the crystal.

The formula for zeolite B may be written in terms of oxide mole ratios as:

$$1.0\pm0.2M_{2/n}O:Al_2O_3:3.5\pm1.5SiO_2:yH_2O$$

wherein M represents a cation as hereinbefore defined, $n$ is the valence of the cation, and $y$ has an average value of 5.1 but may range from 6 to 6.

The formula for zeolite D, in terms of oxide mole ratios, may be represented as:

$$0.9\pm0.2[xNa_2O:(1-x)K_2O]:Al_2O_3:wSiO_2:yH_2O$$

wherein $x$ is a value of 0 to 1, $w$ is from 4.5 to about 4.9 and $y$, in the fully hydrated form, is about 7.

The composition of zeolite L, in oxide mole ratios, may be represented as:

$$1.0\pm0.1M_{2/n}O:Al_2O_3:6.4\pm0.5SiO_2:yH_2O$$

wherein M designates a cation as hereinbefore defined, $n$ represents the valence of M and $y$ is any value from 0 to 7.

The formula for zeolite Q, expressed in terms of oxide mole ratios, may be written as:

$$0.95\pm0.05M_{2/n}O:Al_2O_3:2.2\pm0.05SiO_2:yH_2O$$

wherein M is a cation as hereinbefore defined, $n$ is the valence of the cation, and $y$ is any value from 0 to 5.

The formula for zeolite R in terms of oxide mole ratios may be written as follows:

$$0.9\pm0.2Na_2O:Al_2O_3:wSiO_2:yH_2O$$

wherein $w$ is from 2.45 to 3.65, and $y$, in the hydrated form, is about 7.

The formula for zeolite S in terms of oxide mole ratios may be written as:

$$0.9\pm0.2Na_2O:Al_2O_3:wSiO_2:yH_2O$$

wherein $w$ is from 4.6 to 5.9 and $y$, in the hydrated form, is about 6 to 7.

The formula for zeolite T in terms of oxide mole ratios may be written as:

$$1.1\pm0.4xNa_2O:(1-x)K_2O:Al_2O_3:6.9\pm0.5SiO_2:yH_2O$$

wherein $x$ is any value from about 0.1 to about 0.8 and $y$ is any value from about 0 to about 8.

The formula for zeolite Y expressed in oxide mole ratios is:

$$0.9\pm0.2Na_2O:Al_2O_3:wSiO_2:yH_2O$$

wherein $w$ is a value ranging from 3 to 6 and $y$ may be any value up to about 9.

The formula for zeolite Z in terms of oxide mole ratios may be written as:

$$K_2O:Al_2O_3:2SiO_2:yH_2O$$

wherein $y$ is any value not exceeding 3.

Zeolite ZK–4 can be represented in terms of mole ratios of oxides as:

$$0.1 \text{ to } 0.3R:0.7 \text{ to } 1.0M_{2/n}O:Al_2O_3:2.5 \text{ to } 4.0SiO_2:yH_2O$$

wherein R is a member selected from the group consisting of methylammonium oxide, hydrogen oxide and mixtures thereof with one another, M is a cation as hereinbefore defined, n is the valence of the cation, and y is any value from about 3.5 to about 5.5.

The major lines of the X-ray diffraction pattern of ZK–4 are set forth in Table 1 below.

TABLE 1

| d Value of reflection in A.: | 100 I/I$_0$ |
|---|---|
| 12.00 | 100 |
| 9.12 | 29 |
| 8.578 | 73 |
| 7.035 | 52 |
| 6.358 | 15 |
| 5.426 | 23 |
| 4.262 | 11 |
| 4.062 | 49 |
| 3.662 | 65 |
| 3.391 | 30 |
| 3.254 | 41 |
| 2.950 | 54 |
| 2.725 | 10 |
| 2.663 | 7 |
| 2.593 | 15 |
| 2.481 | 2 |
| 2.435 | 1 |
| 2.341 | 2 |
| 2.225 | 2 |
| 2.159 | 4 |
| 2.121 | 5 |
| 2.085 | 2 |
| 2.061 | 2 |
| 2.033 | 5 |
| 1.90 | 2 |
| 1.880 | 2 |
| 1.828 | 1 |
| 1.813 | 1 |
| 1.759 | 1 |
| 1.735 | 1 |
| 1.720 | 5 |
| 1.703 | 1 |
| 1.669 | 2 |
| 1.610 | 1 |
| 1.581 | 2 |
| 1.559 | 1 |

Zeolite ZK–4 can be prepared by preparing an aqueous solution of oxides containing Na$_2$O, Al$_2$O$_3$, SiO$_2$, H$_2$O and tetramethyl-ammonium ion having a composition, in terms of oxide mole ratios, which falls within the following ratios:

$$SiO_2/Al_2O_3 \quad 2.5 \text{ to } 11$$

$$\frac{Na_2O}{Na_2O + [(CH_3)_4N]_2O} \quad .05 \text{ to } .25$$

$$\frac{H_2O}{Na_2O + [(CH_3)_4N]_2O} \quad 25 \text{ to } 30$$

$$\frac{Na_2O + [(CH_3)_4N]_2O}{SiO_2} \quad 1 \text{ to } 2$$

maintaining the mixture at a temperature of about 100° C. to 120° C. until the crystals are formed, and separating the crystals from the mother liquor. The crystal material is thereafter washed until the wash effluent has a pH essentially that of wash water and subsequently dried.

Zeolite ZK–5 is representative of another crystalline alumino-silicate which is prepared in the same manner as zeolite ZK–4 except that N,N'-dimethyltriethylenediammonium hydroxide is used in place of tetramethyl-ammonium hydroxide. Zeolite ZK–5 may be prepared from an aqueous sodium aluminosilicate mixture having the following composition expressed in terms of oxide mole ratios as:

$$SiO_2/Al_2O_3 \quad 2.5 \text{ to } 11$$

$$\frac{Na_2O}{Na_2O + [(CH_2)_6N_2(CH_3)_2]OH} \quad .05 \text{ to } 25$$

$$\frac{H_2O}{Na_2O + [(CH_2)_6N_2(CH_3)_2]OH} \quad 25 \text{ to } 50$$

$$\frac{Na_2O + [(CH_2)_6N_2(CH_3)_2]OH}{SiO_2} \quad 1 \text{ to } 2$$

The N,N'-dimethyltriethylenediammonium hydroxide used in preparing zeolite ZK–5 can be prepared by methylating 1,4-diazabicyclo-(2.2.2)-octane with methyl iodide or dimethyl sulfate, followed by conversion to the hydroxide by treatment with silver oxide or barium hydroxide. The reaction may be illustrated as follows:

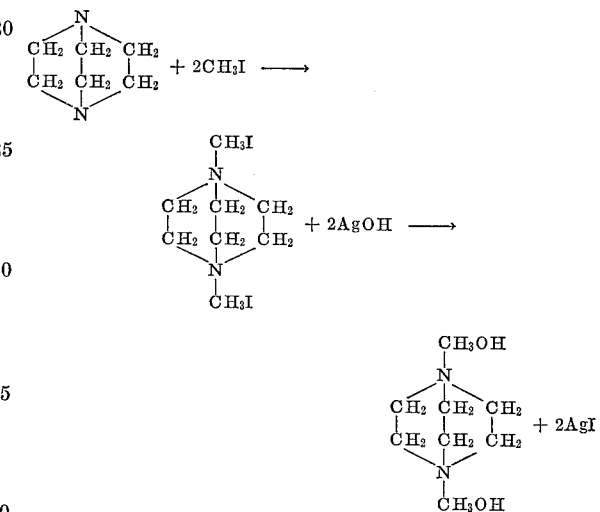

In using the N,N'-dimethyltriethylenediammonium hydroxide compound in the preparation of zeolite ZK–5, the hydroxide may be employed per se, or further treated with a source of silica, such as silica gel, and thereafter reacted with aqueous sodium aluminate in a reaction mixture whose chemical composition corresponds to the above-noted oxide mole ratios. Upon heating at temperatures of about 200 to 600° C., the methyl ammonium ion is converted to hydrogen ion.

Quite obviously, the above-listed molecular sieves are only representative of the synthetic crystalline zeolite molecular sieve catalysts which may be used in the process of the present invention, the particular enumeration of such sieves not being intended to be exclusive.

Molecular sieves are ordinarily prepared initially in the sodium form of the crystal. In general, the process of preparation involves heating, in aqueous solution, an appropriate mixture of oxides, or of materials whose chemical composition can be completely represented as a mixture of oxides Na$_2$O, Al$_2$O$_3$, SiO$_2$ and H$_2$O at a temperature of approximately 100° C. for periods of 15 minutes to 90 hours or more. The product which crystallizes within this hot mixture is separated therefrom and water washed until the water is equilibrium with the zeolite has a pH in the range of 9 to 12. The substance is then ready for treatment in accordance with the process of the present invention to form the alumina-deficient zeolite, after which it may be activated for use by heating until dehydration is attained.

For example, in the preparation of sodium zeolite X, suitable reagents for the source of silica include silica sol, silica gel, silicic acid or sodium silicate. Alumina can be supplied by utilizing activated alumina, gamma alumina, alpha alumna, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the following ranges: $SiO_2/Al_2O_3$ of 3.0 to 5.0, $Na_2O/SiO_2$ of 1.2 to 1.5 and $H_2O/Na_2O$ of 35 to 60. A convenient and generally employed process of preparation involves preparing an aqueous solution of sodium aluminate and sodium hydroxide and then adding with stirring an aqueous solution of sodium silicate.

The reaction mixture is placed in a suitable vessel which is closed to the atmosphere in order to avoid losses of water and the reagents are then heated for an appropriate length of time. Adequate time must be used to allow for recrystallization of the first amorphous precipitate that forms. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. As son as the zeolite crystals are completely formed they retain their structure and it is not essential to maintain the temperature of the reaction any longer in order to obtain a maximum yield of crystals.

After formation, the crystalline zeolite is separated from the mother liquid, usually by filtration. The crystalline mass is then washed, preferably with salt-free water, while on the filter, until the wash water, in equilibrium with the zeolite, reaches a pH of 9 to 12. The crystals are then dried at a temperature between 25° C. and 150° C. The zeolite is then ready to be treated in accordance with the process of the present invention. After such treatment, activation may be attained through dehydration, as for example at 350° C. and 1 mm. pressure or at 350° C. in a stream of dry air.

In an earlier portion of the present specification, the respective tetrahedral structures of the aluminosilicate before and after solvolysis (in that case, hydolysis) were set forth and it was pointed out that, as a result of said hydrolysis, each of the affected aluminum ions in the tetrahedra was replaced by four protons or hydrogen atoms. This substitution is accompanied by an extremely interesting and significant physical phenomenon. More specifically, the oxygen to oxygen bond dimension in an $AlO_4$ tetrahedron is 2.90 A. and in a $SiO_4$ tetrahedron 2.64 A. On the other hand, the ideal O–H . . . O distance, as observed in diaspore, can be taken as approximately 2.65 A. Thus, the size of an H-bonded oxygen tetrahedron is therefore approximately equal to the size of a silica tetrahedron. Accordingly, by virtue of the substitution of four protons for a given aluminum atom during the hydrolysis reaction, the tetrahedron will be transformed to a structure which, by means of X-ray diffraction analysis, would appear to have been enriched in silica by virtue of the contraction of the bond distances.

In addition to indicating a slight contraction of the lattice structure in the treated aluminosilicate, X-ray diffraction analysis indicates a crystallographic structure (i.e., crystal symmetry) in the treated and untreated aluminosilicates which are substantially identical to one another. In view of this fact and since conventional elemental chemical analysis indicates an increase in the silicon/aluminum ratio as between the treated and untreated aluminosilicates, one would normally conclude that aluminum atoms in the crystal structure have been replaced by silicon atoms through a recrystallization technique or the like. Since silicon and aluminum atoms have essentially the same atomic weight (about 28 and 27, respectively), one would expect that the hydrocarbon absorption capacity of the alumina-deficient treated product per unit weight of such product would be essentially the same as that of the untreated material, or one might possibly even expect a decrease in such capacity due to the slight contraction of the lattice structure of the treated aluminosilicate as compared with the untreated material.

Notwithstanding the foregoing, however, one observes by means of standard hydrocarbon absorption tests that a substantial increase in the hydrocarbon adsorption capacity per unit weight of sample results from the treatment of the aluminosilicate in accordance with the present invention and further observes that this capacity per unit weight of silica is substantially the same in the treated and untreated materials. This demonstrates that what was indicated both by X-ray diffraction and chemical analysis, viz., an absolute increase in the quantity of silica per unit cell, is not the case but that, on the contrary, aluminum atoms have been removed from the tetrahedral sites without their replacement by silicon atoms. The following data, based upon adsorption tests conducted to demonstrate the above, support this conclusion:

| Zeolite | Molar Ratio $SiO_2/Al_2O_3$ | Gram Cyclohexane Sorbed/Gram Sample | Gram Cyclohexane Sorbed/Gram $SiO_2$ in Sample |
|---|---|---|---|
| Before Al removal | 4.61 | .191 | .306 |
| After Al removal | 6.94 | .231 | .307 |
| Before Al removal | 4.45 | .187 | .296 |
| After Al removal | 8.30 | .239 | .303 |
| Before Al removal | 4.76 | .196 | .310 |
| After Al removal | 6.70 | .227 | .306 |

The observed increased cyclohexane sorptive capacity of materials which have undergone aluminum removal should serve to distinguish between zeolites in which all tetrahedral sites are occupied by silicon plus aluminum and materials which underwent loss of tetrahedral aluminum from the zeolite.

As indicated above, aluminosilicates treated in accordance with the present invention have substantially the same crystal symmetry as the untreated aluminosilicate. As a result, the treatment of crystalline aluminosilicates in accordance with the present invention can result in aluminosilicates having a crystallographic structure substantially the same as that of the starting aluminosilicate but having different silica/alumina ratios. For example, aluminosilicates having the crystallographic structure of faujasite can be prepared with silica/alumina ratios in excess of about 6/1. It is characteristic of such faujasitic structures, as distinguished from that of mordenite, that they possess channels larger than 4A in at least two dimensions. Similarly, aluminosilicates having the crystallographic structure of chabazite but having a silica/alumina ratio above about 5/1 can be prepared. Still further, porous crystalline aluminosilicates having the crystallographic structure of mordenite but having a silica/alumina ratio above about 10/1 can be prepared. As another example, aluminosilicates having the crystalline structure of zeolite L can be prepared by the process of the present invention with silica/alumina ratios above about 7/1.

Following are examples which will illustrate the various aspects and ramifications of the present invention:

Example 1

This example demonstrates that disodium dihydrogen EDTA is fairly effective in removing alumina from calcium zeolite Y without any loss in sorptive capacity.

A solution was prepared by dissolving 6.4 g. of disodium dihydrogen EDTA dihydrate (17.2 millimoles) in 30 ml. of water. To the solution was added 14.9 g. (8.24 g. on water-free basis) of calcium zeolite Y. This mixture was stirred and refluxed overnight. The solid product was collected on a Buchner funnel and washed with 50 ml. of water. A summary is given in Table A of the properties of the initial zeolite and the final product.

TABLE A

|  | Starting Material | Product |
|---|---|---|
| Wt. Percent: | | |
| Na$_2$O | 2.3 | 7.5 |
| CaO | 10.6 | 2.66 |
| Al$_2$O$_3$ | 22.1 | 19.0 |
| SiO$_2$ | 64.9 | 69.0 |
| Mole Percent: | | |
| Na$_2$O | 2.44 | 8.04 |
| CaO | 12.40 | 3.16 |
| Al$_2$O$_3$ | 14.20 | 12.40 |
| SiO$_2$ | 71.0 | 76.40 |
| Molar Ratio, SiO$_2$/Al$_2$O$_3$ | 5.0 | 6.18 |
| Grams sorbed/100 g. Sample:[1] | | |
| Cyclohexane | 19.6 | 20.5 |
| Water | 32.0 | 31.95 |

[1] Note.—The conditions under which the sorption of cyclohexane and water were determined both above and elsewhere in this specification were as follows: a weighed sample is contacted with desired pure adsorbate vapor in an adsorption chamber at a pressure less than the vapor-liquid equilibrium pressure of the adsorbate at room temperature. This pressure is kept constant (20 mm. with cyclohexane; 12 mm. with water) during the adsorption period. Adsorption is complete when constant pressure is reached. The increase in weight is calculated as the adsorption capacity of the sample.

An extremely effective method for removing alumina from zeolite Y consists in treating calcium zeolite Y with di (tetraethylammonium) dihydrogen EDTA. This method is illustrated in the following example:

Example 2

Sixty-six grams of EDTA was dissolved in 162 ml. of 3.25 N tetraethylammonium hydroxide. The resulting solution was diluted with 211 ml. of water. Fifty-five grams of calcium zeolite Y were added to the solution and the mixture was stirred and refluxed overnight. The highly dilatant solid product was collected on a Buchner funnel and washed with several hundred milliliters of water. A portion of the air dried product was analyzed for Na$_2$O, CaO, Al$_2$O$_3$, SiO$_2$, C and N. A resume of the composition and properties of the starting material and the product are given in Table B:

TABLE B

|  | Starting Material | Product |
|---|---|---|
| Wt. Percent: | | |
| Na$_2$O | 2.59 | 1.75 |
| CaO | 11.10 | 2.66 |
| Al$_2$O$_3$ | [1] 23.40 | [2] 12.90 |
| SiO$_2$ | [3] 62.30 | [3] 52.66 |
| C | 0 | 9.8 |
| N | 0 | 1.43 |
| Mole Percent:[4] | | |
| Na$_2$O | 2.75 | 2.61 |
| CaO | 13.00 | 4.40 |
| Al$_2$O$_3$ | 15.10 | 11.70 |
| SiO$_2$ | 69.1 | 81.1 |
| Molar Ratio, SiO$_2$/Al$_2$O$_3$ | 4.61 | 6.94 |
| Grams sorbed/100 g. sample: | | |
| Cyclohexane | 19.06 | 23.1 |
| Water | 31.5 | 35.1 |

[1] Ignited.
[2] Unignited.
[3] Sample.
[4] Based on ignited sample.

The composition of the product obtained in Example 2 indicates that some other cation, in addition to sodium and calcium, is present. More specifically, the following calculation shows that 40% of the cation sites are occupied by a cation other than sodium and calcium:

$$\frac{\text{(Mole percent Al}_2\text{O}_3\text{-Mole percent Na}_2\text{O-Mole percent CaO)}}{\text{Mole percent Al}_2\text{O}_3} \times 100 =$$

$$\frac{(11.7-2.61-4.4)}{11.7} \times 100 = 40\%$$

The following calculation shows that 41% of the cation sites are occupied by a monovalent, nitrogen-containing cation:

$$\frac{\text{Wt. percent N}}{28} \times \frac{102}{\text{Wt. percent Al}_2\text{O}_3} \times 100 =$$

$$\frac{1.43}{28} \times \frac{102}{12.9} \times 100 = 41\%$$

The next and last calculation shows that the monovalent, nitrogen-containing cation in the product is tetraethylammonium ion:

Wt. percent C/wt. percent N.—Calc. for $(C_2H_5)_4N+$: 6.85. Found: 6.8.

The next example shows that Equation 1 [previously set forth above] does not go to completion but probably involves an equilibrium between EDTA and zeolite Y for calcium ion.

Example 3

In a manner similar to that described in Example 2, three samples of calcium zeolite Y were treated with various amounts of di(tetraethylammonium) dihydrogen EDTA solution. The results of these experiments are summarized in Table C:

TABLE C

| Moles EDTA Used Per g.-atom Ca in Ca Zeolite Y Used | Percent Removed From Zeolite | |
|---|---|---|
|  | Ca$^{++}$ | AlO$_2^-$ |
| 0.70 | 32 | 18 |
| 1.45 | 64 | 28 |
| 3.63 | 72 | 35 |

Example 4

A sample calcium zeolite Y was given four successive treatments with excess di(tetraethylammonium) dihydrogen ethylenediaminetetraacetate. Following is a summary of the properties of the zeolite after each treatment:

TABLE D

| Treatment | Total Percent Removal | | Molar Ratio SiO$_2$/Al$_2$O$_3$ | Grams Sorbed/100 Grams Sample | |
|---|---|---|---|---|---|
|  | Ca$^{++}$ | AlO$_2$ |  | Cyclohexane | Water |
| 0 | 0 | 0 | 4.45 | 19.1 | 31.5 |
| 1 | 39 | 18 | 5.4 | 21.5 | 35.8 |
| 2 | 73 | 36 | 6.0 | 23.8 | 36.5 |
| 3 | 90 | 46 | 8.3 | 23.6 | 35.6 |
| 4 | 97 | 46 | 8.3 | 23.9 | 34.4 |

These data indicate that not more than 45 to 50% of the alumina can be removed from the zeolite although removal of calcium is nearly complete. A continuous flow column procedure would be expected to give similar results.

The above data also indicate that maximum removal of alumina and the zeolite cation can be effected through treatment of the zeolite with successive batches of fresh chelating solution.

Examples 5–8 will demonstrate that EDTA can be used directly as a method to increase the SiO$_2$/Al$_2$O$_3$ ratio substantially in crystalline alumino-silicates of the NaY type. This is accomplished without seriously destroying or affecting the adsorptive and crystalline properties.

Example 5

The starting material (utilized in the runs of Examples 6–8), containing 9.6 wt. percent Na, 19.6 wt. percent Al$_2$O$_3$, and 66.8 wt. percent SiO$_2$, had the basic formula 0.923 Na$_2$O·Al$_2$O$_3$·5.8 SiO$_2$ and had a cyclohexane adsorption of 19.7 wt. percent. Characterized by X-ray analysis, this material had a lattice constant of $a_0$24.61 A. This was prepared in accordance with Belgian Patent 598,-528 to Union Carbide Co. This material (NaY) is identified as Example 5 in Table E.

Example 6–8

Examples 6, 7 and 8 were prepared by successive treatments of ½ lb. of the above NaY containing 60% solids with 20 g. portions of EDTA each in 200 cc. H$_2$O for 24 hours at 200° F. The total EDTA used was equivalent to 1½ times the theoretical necessary to form Tetra Na EDTA. After each contact the sample was filtered and washed with an equal volume of water. Samples were taken after each contact for adsorption, composition and X-ray analysis.

Compositional analysis of each of the Examples 6, 7 and 8 shows that additional alumina and sodium are chelated after each contact with the EDTA. The starting $SiO_2/Al_2O_3$ mole ratio of 5.8/1 was increased to 7.04 in Examples 6, 9.12 in Example 7 and 12 in Example 8 (after the third contact).

The adsorptive properties for cyclohexane start at 19.7 wt. percent, increase to 20.7 after the first contact, then gradually decrease to 17.3 after the third contact. This is exceptionally good for a product having a $SiO_2/Al_2O_3$ ratio of 12/1.

X-ray analysis of the same series of samples taken after each EDTA contact are also summarized in Table E. These data show that the first contact (Example 6) increases the lattice constant to $a_0$24.63 A. Continued contacting with EDTA not only increases the $SiO_2/Al_2O_3$ ratio but also decreases the lattice constant to $a_0$24.55 A.

Examples 9-13

In Examples 6-8, a high silica NaY aluminosilicate (5.8 $SiO_2/Al_2O_3$) was used as the starting material. Examples 10-13 demonstrate that similar increases in $SiO_2/Al_2O_3$ ratios may be obtained from successive treatments of a low silica NaY aluminosilicate (4.37 $SiO_2/Al_2O_3$) with EDTA. A description of the details of these examples is set forth in Table E'.

As will be seen in Table E', in this preparation, the $SiO_2/Al_2O_3$ ratio was not increased as much as in the high silica NaY run of Examples 5-8. Similarly to the runs of Examples 5-8, the X-ray data for Examples 10-13 show an increase in unit cell dimension from $a_0$24.66 A. to $a_0$24.69 A., then progressive decrease to $a_0$24.60 A. The adsorptive properties in this series also show increased cyclohexane adsorption after the first contact, then progressive decline to 13.2 wt. percent cyclohexane adsorption.

These results were unexpected since EDTA is not soluble in water and is assumed to be too large to go into the aluminosilicate structure. The analytical data substantiate the fact that chelation has occurred since both sodium and alumina were reduced. Although the solution pH in this process is low (about 3.6 to 4.7), no serious damage to crystallinity occurs (except in the case of Example 13, where the overextension of the treatment resulted in an unsatisfactory product of 44% crystallinity). This can be explained by the limited reactivity of the EDTA due to its limited solubility.

The described process of contacting crystalline aluminosilicates with EDTA for control of $SiO_2/Al_2O_3$ ratio can be applied easily to a commercial process. The resulting sodium alumina chelate can be decomposed by heating in a caustic solution, precipitating out the insoluble alumina. It may also be possible to strongly acidify the sodium alumina chelate to form the insoluble tetrahydrogen EDTA. The resulting soluble sodium EDTA can be converted to insoluble EDTA simply by acidifying with any acid. The recovered EDTA can thus be recycled for additional chelation. Recovery of the chelating agents used in the other examples described herein may be similarly effected.

TABLE E.—EDTA MODIFICATIONS OF Y ALUMINOSILICATES [1]

| | Example No. | | | |
|---|---|---|---|---|
| | 5 | 6 | 7 | 8 |
| Description | Base: High $SiO_2$NaY (5.8 $SiO_2/Al_2O_3$) | | | |
| Processing: | | | | |
| NaY (wt. lb.) | ½ | ½ | ½ | ½ |
| EDTA, wt. g | | 20 | 20 | 20 |
| Temp., °F | | 200 | 200 | 200 |
| Contact, Hrs | | 24 | 24 | 24 |
| Composition as Analyzed: | | | | |
| Na, Wt. percent | 9.6 | 7.5 | 6.3 | 5.1 |
| $Al_2O_3$, Wt. percent | 19.6 | 17.2 | 14 | 11.4 |
| $SiO_2$, Wt. percent | 66.8 | 71 | 75 | 80.8 |
| $Na_2O/SiO_2$ M ratio | 0.188 | 0.138 | 0.11 | 0.089 |
| $Na_2O/Al_2O_3$ M ratio | 1.085 | 0.965 | 1.00 | 1.00 |
| $SiO_2/Al_2O_3$ M ratio | 5.8 | 7.04 | 9.12 | 12 |
| Percent $Al_2O_3$ Removed | 0 | 17 | 27 | 54 |
| Adsorption: Cyclohexane, Wt. Percent | 19.7 | 20.5 | 19.5 | 17.3 |
| X-Ray Analyses: | | | | |
| Lattice Constant, $a_0$(A.) | 24.61 | 24.63 | 24.60 | 24.55 |
| Relative Crystallinity | 100 | 80 | 60 | 52 |

[1] Processing was by successive treatments of EDTA. Thus, Example 8 had three treatments with 20 g. EDTA.

TABLE E'.—EDTA MODIFICATIONS OF Y ALUMINOSILICATES [1]

| | Example No. | | | | |
|---|---|---|---|---|---|
| | 9 | 10 | 11 | 12 | 13 |
| Description | Base: Low-$SiO_2$NaY (4.37 $SiO_2/Al_2O_3$) | | | | |
| Processing: | | | | | |
| NaY (wt. lbs.) | ½ | ½ | ½ | ½ | ½ |
| EDTA, wt. g | | 20 | 20 | 20 | 20 |
| Temp., °F | | 200 | 200 | 200 | 200 |
| Contact, Hrs | | 24 | 24 | 24 | 24 |
| Composition as Analyzed: | | | | | |
| Na, Wt. percent | 10.7 | 9.9 | 8.6 | 6.8 | 5.2 |
| $Al_2O_3$, Wt. percent | 23.7 | 21.1 | 18.8 | 17.0 | 12.7 |
| $SiO_2$, Wt. percent | 60.9 | 65.1 | 69.4 | 73.5 | 79.0 |
| $Na_2O/SiO_2$ M ratio | 0.229 | 0.200 | 0.162 | 0.120 | 0.0856 |
| $Na_2O/Al_2O_3$ M ratio | 1.00 | 1.05 | 1.02 | 0.887 | 0.908 |
| $SiO_2/Al_2O_3$ M ratio | 4.37 | 5.25 | 6.25 | 7.34 | 10.5 |
| Percent $Al_2O_3$ removed | 0 | 17 | 30 | 41 | 59 |
| Adsorption: Cyclohexane, Wt. percent | 20.1 | 20.7 | 19.9 | 18.0 | 13.2 |
| X-ray Analyses: | | | | | |
| Lattice Constant, $a_0$(A.) | 24.66 | 24.69 | 24.63 | 24.61 | 24.46 |
| Relative Crystallinity | 100 | 87 | 81 | 62 | |

[1] Processing was by successive treatments of EDTA. Thus, Example 13 had four treatments with 20 g. EDTA.

Example 14

This example will serve to illustrate that the EDTA method of alumina chelation for increased $SiO_2/Al_2O_3$ ratio can be applied to an NaX type crystalline aluminosilicate.

Example 14 was prepared by contacting ½ lb. wet cake (60% solid) of commercial aluminosilicate (13X) twice with 25.1 g. EDTA in 200 cc. $H_2O$ for 24 hours at 200° F. in each contact. As will be seen in Table F, the $SiO_2/Al_2O_3$ ratio was increased from 2.5 to 3.06 in Example 14. Cyclohexane adsorption and X-ray analysis show that the $SiO_2/Al_2O_3$ ratio can be increased in NaX to 3.06 without seriously damaging the crystallinity.

TABLE F.—CHELATION WITH EDTA

| | |
|---|---|
| Example No. | 14 |
| Base material: | |
| Type | NaX |
| Composition— | |
| Na, wt. percent | 14.3 |
| $Al_2O_3$, wt. percent | 31.6 |
| $SiO_2$, wt. percent | 47.1 |
| $SiO_2/Al_2O_3$ M ratio | 2.53 |
| Adsorption— | |
| Cyclohexane, wt. percent | 17.9 |
| X-ray analysis— | |
| Crystallinity, percent | 90 |

TABLE F.—Continued

Chelation reaction:
  Wt. base, lb. _____ ½
Contacting solution—
  EDTA, g. _____ 25.1
  H₂O, cc. _____ 200
  No. contacts _____ 2
  Temp. contacts, ° F. _____ 200
  pH off _____ 5.7
Composition of treated catalyst—
  Na, wt. percent _____ 12.0
  Al₂O₃, wt. percent _____ 29.1
  SiO₂, wt. percent _____ 52.0
  SiO₂/Al₂O₃ M ratio _____ 3.06
  Percent Al₂O₃ removed _____ 17
Adsorption—
  Cyclohexane, wt. percent _____ 16.1
X-ray—
  Crystallinity, percent _____ 75

Adsorptive and X-ray data for these two NaY materials show that the cyclohexane adsorption was increased about ½ wt. percent. The X-ray data show essentially no change.

Example 17 demonstrates that NaX can be treated in like manner without serious reduction in adsorptive properties. The cyclohexane adsorption was reduced from 17.9 wt. percent to 15.2.

Examples 18 and 19 show that either ammonium acid EDTA or ammonium acid citrate can function in similar manner forming acid crystalline aluminosilicate which is stable to tempering up to 650° F. for the period of pretreatment in the adsorption test and which still adsorbs very little cyclohexane, thus indicating little loss in crystallinity. The water adsorption was not seriously affected, giving respectively 26.9 and 27.5 wt. percent water adsorption.

The high catalytic activities obtained by aluminosilicate compositions prepared in accordance with the present in-

TABLE G.—CHELATION WITH AMMONIUM CHELATING SALTS

| | Example No. | | | | |
|---|---|---|---|---|---|
| | 15 | 16 | 17 | 18 | 19 |
| Base Material: Type | NaY | NaY | NaX | NaA | NaA |
| Composition: | | | | | |
| Na, Wt. percent | 9.7 | 9.6 | 14.3 | 15.3 | 15.3 |
| Al₂O₃, Wt. percent | 23.5 | 19.0 | 31.6 | 34.7 | 34.7 |
| SiO₂, Wt. percent | 62.6 | 68.7 | 47.1 | 40.9 | 40.9 |
| SiO₂/Al₂O₃ M Ratio | 4.52 | 6.15 | 2.53 | 2.0 | 2.0 |
| Adsorption: Cyclohexane, Wt. percent | 20.4 | 19.3 | 17.9 | | |
| X-ray Analysis: Lattice Constant, $a_0$(A.) | 24.66 | 24.58 | 24.96 | | |
| Chelation Reaction: | | | | | |
| Wt. Base, Lb | ½ | ½ | ½ | ½ | |
| Percent Solids | 60 | 60 | 60 | 100 | |
| Contacting Solution: | | | | | |
| EDTA, g | 20 | 20 | 28.9 | 29.95 | (¹) |
| NH₄OH, g.² | 8 | 8 | 11.85 | 11.95 | 18.5 |
| H₂O, cc | 200 | 200 | 200 | 400 | 400 |
| No. Contacts | 4 | 4 | 4 | 4 | 4 |
| Temp. Contacts | 200 | 200 | 200 | 200 | 200 |
| pH On | | | | 5.7 | 6.1 |
| pH Off | 6.1-5.5 | 5.8-5.6 | 7.7-6.5 | 5.7 | 6.1 |
| Composition of Treated Catalyst: | | | | | |
| Na, Wt. percent | 4.0 | 2.8 | 7.3 | 10.1 | 9.08 |
| Al₂O₃, Wt. percent | 22.6 | 19.6 | 33.2 | 36.6 | 37.8 |
| SiO₂, Wt. percent | 73.5 | 74.8 | 54.7 | 47.7 | 47.11 |
| SiO₂/Al₂O₃, M Ratio | 5.55 | 6.45 | 2.81 | 2.22 | 2.11 |
| Percent Al₂O₃ Removed | 18 | 5 | 9 | 10 | 5 |
| Adsorption: | | | | | |
| Cyclohexane, Wt. percent | 20.8 | 19.8 | 15.2 | (³) | 0.5 |
| H₂O, Wt. percent | | | | 26.9 | 27.5 |
| X-ray: Lattice Constant, $a_0$(A₀) | 24.66 | 24.58 | 24.91 | | |

¹ Ammonium acid citrate 19.4.
² Concentrated aqueous ammonia in amount to give the di-ammonia salt.
³ 0.7 cyclohexane, 4.6 n-hexane.

[Note: the resulting alumiosilicate in the run of Example 14 contains a slight amount of form "P" aluminosilicate in addition to the NaX form. When used in this specification, "pH Off" designates the pH of the solution after contact with the aluminosilicate; "pH On" before such contact.]

Examples 15–19

These examples (the results and details of which are shown in Table G) will serve to demonstrate that ammonium salts of chelating agents can also function as desired, increasing the SiO₂/Al₂O₃ ratio in crystalline aluminosilicates. In addition, these chelating salts also exchange the residual sodium to form ammonium forms of the aluminosilicates.

Examples 15 and 16 were respectively conducted by contacting low silica NaY (4.52 SiO₂/Al₂O₃) and a high silica NaY (6.15 SiO₂/Al₂O₃) for 4 contacts each at 200° F. for 24 hours using 20 g. EDTA+NH₄OH to form the (NH₄)₂H₂EDTA chelating agent.

The SiO₂/Al₂O₃ ratio was increased from 4.52 to 5.55 in the first case and from 6.15 to 6.45 in the second case. The sodium content on the other hand was reduced from 9.7 to 4.0 wt. percent in the first and from 9.6 to 2.8 in the second high silica case.

vention can be readily illustrated in connection with the cracking of a representative hydrocarbon charge. In a number of the examples hereinafter set forth, the reference catalyst employed consisted of a conventional silica-alumina "bead" type cracking catalyst. The silica-alumina catalyst contained about 10 weight percent Al₂O₃ and the remainder SiO₂. In some instances, it also contained a trace amount of Cr₂O₃, i.e., about 0.15 weight percent.

The cracking activity of the catalyst is further illustrated by its ability to catalyze the conversion of a Mid-Continent Gas Oil having a boiling range of 450–950° F. to gasoline having an end point of 410° F. Vapors of the gas oil are passed through the catalyst at temperatures of 875° F. or 900° F. substantially at atmospheric pressure at a feed rate of 2.0 to 16 volumes of liquid oil per volume of catalyst per hour for ten minutes. The method of measuring the instant catalyst was to compare the various product yields obtained with such catalyst with yields of the same products given by conventional silica-aluminum catalysts at the same conversion level and at the same temperature. The differences (Δ values) shown hereinafter represent the yields given by the present catalyst minus yields given by the conventional catalyst. In these tests, the catalyst compositions of the invention were precalcined at about 1000° F. prior to their evaluation as a cracking catalyst.

Examples 20-21

These examples (the details and results of which are set forth in Table H) illustrate the catalytic advantages obtained by pretreating a sodium aluminosilicate with a chelating agent such as EDTA to increase the $SiO_2/Al_2O_3$ mole ratio, prior to exchange with cations, i.e., with rare earth ions.

Examples 20 and 21 were prepared respectively by pretreating Y aluminosilicates as described in Examples 11 and 7: contacting the low silica and high silica NaY twice with EDTA at 200° F. for 24 hours and then continuously base exchanging with a combined solution of 5% $RECl_3 \cdot 6H_2O + 2\%$ $NH_4Cl$. These materials were then further processed to reduce the residual sodium content to 0.8 wt. percent in the case of the low silica NaY (Ex. 21) and 1.13 when using the high silica NaY (Ex. 20). (The corresponding $SiO_2/Al_2O_3$ ratios were 5.95/1 and 7.25/1 respectively.) The catalysts were then washed, dried, pelleted to a size of 4 x 10 mesh, tempered 10 hours at 1000° F. and steam treated 24 hours at 1200° F. with 100% steam at 15 p.s.i.g. Again, catalytic results on the final materials were excellent. [Note: unless otherwise indicated, $RECl_3$ when used in this specification shall refer to a mixture of rare earth chlorides consisting essentially of the chlorides of lanthanum, cerium, neodymium and praseodymium, with minor amounts of samarium, gadolinium and yttrium. A rare earth chloride solution containing such mixture is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Similarly, the cation "RE" shall be construed to cover the same mixture of rare earth cations unless otherwise specified.]

TABLE H.—UNDILUTED CATALYST PREPARATION

| Example No. | 20 | 21 |
|---|---|---|
| Description | (1) | (2) |
| Base Exchange: | | |
| Solution | $RECl_3 \cdot 6H_2O + NH_4Cl$ | |
| Conc., Wt. Percent | 5 | 2 |
| Contacts | 90 lbs. per lb. at 180° F. | |
| Composition of Treated Catalyst: | | |
| Na, Wt. Percent | 0.8 | 1.13 |
| $(RE)_2O_3$, Wt. Percent | 6.8 | 5.13 |
| $Al_2O_3$, Wt. Percent | 20.7 | 14.8 |
| $SiO_2$, Wt. Percent | 62.9 | 72.7 |
| Physical Properties (Fresh Catalyst): | | |
| App. Dens., g./cc. | 0.38 | 0.38 |
| Adsorption—Cyclohexane, Wt. Percent | [1] 21.7  [3] 17.2 | [2] 17.7  [3] 14.3 |
| X-ray Analysis: Lattice Cell Constant, $a_0(A.)$ | 24.64 | 24.58 |
| Catalytic Evaluation (Steamed Catalyst): [4] | | |
| Conditions: | | |
| LHSV [5] | 16 | 16 |
| C/O | 0.38 | 0.38 |
| Conversion, Vol. Percent | 66.5 | 61.5 |
| 10 RVP Gaso., Vol. Percent | 61.6 | 60.0 |
| Excess $C_4$'s, Vol. Percent | 10.7 | 7.8 |
| $C_5+$ Gasoline, Vol. Percent | 58.6 | 56.6 |
| Total $C_4$'s, Vol. Percent | 13.2 | 11.3 |
| Dry Gas, Wt. Percent | 5.3 | 3.8 |
| Coke, Wt. Percent | 1.45 | 1.0 |
| $H_2$, Wt. Percent | 0.01 | 0.01 |
| Delta Advantage over Si/Al: | | |
| 10 RVP, Gaso., Vol. Percent | +13.9 | +14.8 |
| Excess $C_4$'s, Vol. Percent | −6.0 | −6.4 |
| $C_5+$ Gasoline, Vol. Percent | +13.0 | +13.4 |
| Total $C_4$'s, Vol. Percent | −4.8 | −4.9 |
| Dry Gas, Wt. Percent | −3.2 | −3.8 |
| Coke, Wt. Percent | −5.2 | −3.7 |

[1] Prepared as described in Example 11: Na, 8.0; $Al_2O_3$, 19.4; $SiO_2$, 68.0; $SiO_2/Al_2O_3$, 5.95; cyclohexane adsorption, wt. percent: 21.7.
[2] Prepared as described in Example 7: Na, 7.0; $Al_2O_3$, 17.9; $SiO_2$, 76.3; $SiO_2/Al_2O_3$, 7.25; cyclohexane adsorption, wt. percent 17.7.
[3] Finished catalyst.
[4] Where denoted "steamed" (here and elsewhere in this specification), the catalyst has been treated with 100% steam at 1,200° F. and 15 p.s.i.g. for 24 hours. The symbol "C/O" designates catalyst/oil ratio.
[5] Liquid hourly space velocity.

Examples 22–24 demonstrate the effectiveness of EDTA treatment on calcium and rare earth exchanged aluminosilicates. The data for these examples are set forth in Table I.

Example 22

This example was prepared by EDTA treating a CaHY aluminosilicate (dried at 230° F.) containing 1.4 wt. percent Na, 24.3 wt. percent $Al_2O_3$, 6.8 wt. percent Ca, and 63.6 wt. percent $SiO_2$ and having a $SiO_2/Al_2O_3$ mole ratio of 4.67/1. EDTA treatment consisted of contacting ¼ lb. of the CaHY base with 2 contacts of 20 g. EDTA in 200 cc. $H_2O$ each for 24 hours at 200° F. The treated material was washed, dried at 230° F., pelleted and sized to 4/10 mesh, tempered at 1000° F., and steam treated for 24 hours at 1200° F. with 15 p.s.i.g. steam.

The final catalyst analyzed 1.43 wt. percent Na, 20 wt. percent $Al_2O_3$, 70.7 wt. percent $SiO_2$, 5.2 wt. percent Ca, and had a $SiO_2/Al_2O_3$ mole ratio of 6.05/1.

Catalytic data summarized in Table I show that this catalyst had improved selectivity after the alumina chelation treatment, as measured by vol. present $C_5+$ gasoline production. The improvement was about 2 vol. percent more $C_5+$ gasoline yield. However, a 3 vol. percent decrease in the standard gas oil cracking test activity at 16 LHSV was noted.

Example 23

Preparation of this example was accomplished by treating a REHY aluminosilicate with EDTA in the same manner as described in Example 22. In this preparation, the $SiO_2/Al_2O_3$ mole ratio was increased from 4.5/1 to 6.05/1. In this process, the rare earth content was only decreased slightly from 14.8 to 13.4 wt. percent in the final catalyst. In addition to the rare earth decrease, the residual sodium content was decreased from 1.36 to 1.01 wt. percent.

Catalytic evaluation of this catalyst also shows that it is catalytically advantageous in $C_5+$gasoline yield to treat a REHY catalyst with a complexing agent. The catalyst was less active (59.6 vol. percent conversion at 16 LHSV in the standard gas oil cracking test, compared to 66.1 for the original REHY). The $C_5+$gasoline yield was increased from +10.5 to +12.4 vol. percent over standard Si/Al catalysts. The coke advantage is also obvious, showing a decrease from 2.2 wt. percent to 0.8 wt. percent. This type of coke decrease is typical for the EDTA-treated rare earth catalysts.

In both examples, the gain in selectivity was about +2 vol. percent $C_5+$gasoline advantage over the untreated CaHY and REHY catalysts at a lower conversion.

Example 24

Preparation of this example was accomplished by treating a CaHY aluminosilicate with a complex ammonium EDTA, di(tetraethylammonium) dihydrogen EDTA (see Examples 2–4). This run involved the treatment of 70 g. of CaHY with 4 successive treatments each for at least 16 hours duration at reflux (100° C.). Each contact was with 260 ml. of solution prepared by treating 52.6 g. EDTA with sufficient quaternary ammonium hydroxide so that the solution is about 1.4 N based on tetraethylammonium ion. The treated material was further water washed 200 ml. of water.

At this point, the product having a $SiO_2/Al_2O_3$ ratio of 6.78 also had an increased sodium content of 4.39 mol. percent due to the sodium in the complex ammonium EDTA. It was necessary to base exchange this catalyst again with calcium-ammonium chloride to exchange the sodium. The complex ammonium EDTA treatment also almost completely extracted the initial calcium present.

The final calcium catalyst analyzed 0.14 wt. percent Na, 19.6 wt. percent $Al_2O_3$, 71.8 wt. percent $SiO_2$, 6.4 wt. percent Ca and had a $SiO_2/Al_2O_3$ mole ratio of 6.22.

Catalytic data summarized in Table I show that the complex ammonium EDTA treatment was not only beneficial in selectiviey but also in activity, giving a +12.9 vol. percent $C_5+$gasoline advantage over standard Si/Al and also a 72.1 vol. percent conversion at 10 LHSV in the standard gas oil cracking test.

TABLE I.—EDTA TREATMENT OF CaHY AND REHY CATALYSTS

| Example No | 22 | 22 | 23 | 23 | 24 |
|---|---|---|---|---|---|
| Description of Starting Material: | | | | | |
| Base | NaY | CaHY | NaY | REHY | CaHY |
| SiO₂/Al₂O₃, Mole Ratio | 4.5 | | 4.5 | | 4.3 |
| Base Exchange: Solution | (¹) | (³) | (²) | (³) | (⁴) |
| Composition of Treated Catalyst: | | | | | |
| Na, Wt. Percent | 1.4 | 1.43 | 1.36 | 1.01 | 0.14 |
| (RE)₂O₃, wt. percent | | | 14.8 | 13.4 | |
| Al₂O₃, wt. percent | 24.3 | 20.0 | | 18.8 | 19.6 |
| SiO₂, wt. percent | 63.6 | 70.0 | | 66.5 | 71.8 |
| Ca, wt. percent | | 5.2 | | | 6.4 |
| SiO₂/Al₂O₃, Mole Ratio | 4.67 | 6.05 | 4.5 | 6.05 | 6.22 |
| Physical Properties: | | | | | |
| Surface Area, m.²/g., Steamed | | 155 | | 251 | |
| X-Ray Analysis: ⁵ Lattice Constant, $a_0$ (A.) | 24.64 | 24.64 | 24.7 | 24.52 | 24.64 |
| Catalytic Evaluation: | | | | | |
| Conditions: | | | | | |
| LHSV | 10 | 10 | 16 | 16 | 10 |
| C/O | 0.6 | 0.6 | 0.38 | 0.38 | 0.6 |
| Conv., Vol. Percent | 57.5 | 54.6 | 66.1 | 59.6 | 72.1 |
| 10 RVP Gaso., Vol. Percent | 52.6 | 53.5 | 58.9 | 57.7 | 63.6 |
| Excess C₄'s, Vol. Percent | 8.8 | 5.3 | 10.5 | 7.5 | 11.6 |
| C₅+ Gasoline, Vol. Percent | 49.8 | 49.9 | 55.8 | 54.5 | 60.0 |
| Total C₄'s, Vol. Percent | 11.6 | 8.9 | 13.6 | 10.8 | 14.6 |
| Dry Gas, wt. percent | 4.9 | 4.1 | 5.8 | 4.5 | 7.0 |
| Coke, wt. percent | 1.2 | 1.0 | 2.2 | 0.8 | 1.89 |
| H₂, wt. percent | 0.01 | 0.01 | 0.02 | 0.01 | 0.01 |
| Delta Advantage Over Si/Al: | | | | | |
| 10 RVP, Gaso., Vol. Percent | +9.0 | +11.8 | +11.5 | +13.6 | |
| Excess C₄'s, Vol. Percent | −4.2 | −6.4 | −5.5 | −6.1 | |
| C₅+ Gasoline, Vol. Percent | +8.4 | +10.3 | +10.5 | +12.4 | +12.9 |
| Total C₄'s, Vol. Percent | −3.4 | −5.0 | −4.4 | −4.8 | −5.8 |
| Dry Gas, wt. percent | −2.3 | −2.4 | −2.7 | −2.8 | −2.7 |
| Coke, wt. percent | −2.9 | −2.5 | −3.5 | −3.7 | −5.0 |

¹ Base exchanged with 5% CaCl₂+2% NH₄Cl solution at 180° F., with no chelation treatment.
² Base exchanged with 5% RECl₃·6H₂O+2% NH₄Cl, with no chelation treatment.
³ 2-24 hr. contacts with EDTA; 20 g./½ lb. base.
⁴ Di(tetraethylammonium) EDTA.
⁵ X-ray analysis of tempered catalyst.

Example 25

This example (the data for which is in Table J) demonstrates that an aluminosilicate can first be pre-treated with a complexing agent to remove alumina and then base exchanged with a divalent cation of the calcium type in combination with ammonium. This preparation started with the treatment of 4 lbs. of high silica NaY aluminosilicate (6.3 $SiO_2/Al_2O_3$) twice with 160 g. EDTA in 1600 cc. H₂O at 200° F. for 24 hours each. After this treatment, the $SiO_2/Al_2O_3$ mole ratio was 8.6/1. One-half pound of the above aluminosilicate was treated continuously at 180° F. with 90 lbs. of combined 5% CaCl₂-2% NH₄Cl followed by water wash, drying at 230° F., pelleting and sizing to 4/10 mesh, tempering and then steam treating for 24 hours at 1200° F. with 15 p.s.i.g. steam.

The final catalyst analyzed 0.8 wt. percent Na, 6.99 wt. percent Ca and a $SiO_2/Al_2O_3$ mole ratio of 7.25/1.

The standard gas oil cracking evaluation at 10 LHSV of the steamed catalyst shows this catalyst to be very active (70.9 vol. percent conversion) and very selective (+12.6 vol. percent C₅+gasoline more than standard Si/Al at the same conversion).

TABLE J.—EDTA PRE-TREATMENT FOLLOWED BY CALCIUM-AMMONIUM

|  | EDTA treated NaY; 8.6 $SiO_2/Al_2O_3$. |
|---|---|
| Example No. | 25. |
| Description |  |
| Base exchange: |  |
| Solution | CaCl₂—NH₄Cl. |
| Conc., wt. percent | 5    2 |
| Contacts | 90 lbs. per ½ lb. for 3 days. |
| Composition: |  |
| Na, wt. percent | 0.8. |
| Al₂O₃, wt. percent | 17.4. |
| SiO₂, wt. percent | 73.6. |
| Ca, wt. percent | 6.99. |
| $SiO_2/Al_2O_3$, mole ratio | 7.25. |
| Physical properties of treated catalyst: |  |
| Surface area, m.²/g., steamed | 282. |
| X-ray analysis: |  |
| Lattice constant, $a_0$ (A.) | 24.61. |
| Catalytic evaluation: |  |
| Conditions: |  |
| LHSV | 10. |
| C/O | 0.6. |
| Conversion, vol. percent | 70.9. |
| 10 RVP gaso., vol. percent | 62.6. |
| Excess C₄'s, vol. percent | 11.6. |
| C₅+ gasoline, vol. percent | 59.6. |
| Total C₄'s, vol. percent | 14.6. |
| Dry gas, wt. percent | 5.9. |
| Coke, wt. percent | 2.7. |
| H₂, wt. percent | 0.01. |
| Delta advantage over Si/Al: |  |
| C₅ +gasoline, vol. percent | +12.6. |
| Total C₄'s, vol. percent | −5.4. |
| Dry gas, wt. percent | −3.6. |
| Coke, wt. percent | −4.0. |

Example 26

This example (the data for which are in Table K) demonstrates that an acid Y aluminosilicate having excellent catalytic properties can be made in the same manner as described in Example 25.

Two pounds of high silica NaY aluminosilicate was contacted twice with 80 g. EDTA in 800 cc. H₂O for 24 hours at 200° F. This treatment increased the $SiO_2/Al_2O_3$ molar ratio from 6.3/1 to 10/1. One-half pound of this aluminosilicate was then treated 4 times with (NH₄)₂H₂EDTA at 200° F. using 40 g. EDTA+NH₄OH per contact. Three of these contacts were for a 24 hour duration and one was for 72 hours. The treated aluminosilicate was washed, dried at 200° F., pelleted and sized to 4/10 mesh, tempered and then steam treated for 24 hours at 1200° F. with 15 p.s.i.g. steam.

The final catalyst analyzed Na, 1.5 wt. percent; Al₂O₃ 13.1 wt. percent; SiO₂ 86.1 wt. percent. The final $SiO_2/Al_2O_3$ molar ratio was 11.1/1.

Standard gas oil cracking test data summarized in Table K shows that this acid Y aluminosilicate is active at 10 LHSV (51.3 vol. percent conversion) and is selective, giving an advantage of +9.0 vol. percent $C_5$+gasoline over standard Si/Al.

TABLE K

Example No. _____ 26.
Description _____ EDTA treated high $SiO_2$ NaY; 10/1 $SiO_2/Al_2O_3$.

Base exchange:
    Solution _____ $(NH_4)_2H_2EDTA$.
    Conc., wt. percent _____ 10% EDTA solution.
    Contacts _____ 4 contacts at 200° F., 24 hrs. each.

Composition of treat catalyst:
    Na, wt. percent _____ 1.5.
    $Al_2O_3$, wt. percent _____ 13.1.
    $SiO_2$, wt. percent _____ 86.1.
    $SiO_2/Al_2O_3$, molar ratio . 11.1/1.

Physical properties

X-ray analysis:
    Lattice constant $a_0$ (A.) _. 24.58.

Catalytic evaluation

Condition:
    LHSV _____ 10.
    C/O _____ 0.6.
    Conv., vol. percent _____ 51.3.
    10 RVP gaso., vol. percent 48.8.
    Excess $C_4$'s, vol. percent 6.9.
    $C_5$+ gaso., vol. percent . 46.2.
    Total $C_4$'s, vol. percent ___ 9.6.
    Dry gas, wt. percent _____ 3.9.
    Coke, wt. percent _____ 0.53.
    $H_2$, wt. percent _____ 0.01.

Delta advantage over Si/Al:
    $C_5$+ gasoline, vol. percer +9.0.
    Total $C_4$'s, vol. percent __. −3.6.
    Dry gas, wt. percent _____ −2.3.
    Coke, wt. percent _____ −2.6.

Example 27

This preparation (data for which are in Table L) serves to demonstrate a process of combining a complexing agent with cation exchanger and ammonium. The complexing agent was EDTA and the cation exchanger was manganese.

The exchange process consisted of contacting ½ lb. of high silica NaY aluminosilicate (6.3/1 $SiO_2/Al_2O_3$) 8 times with 200 cc. solution of manganese chloride, EDTA, $NH_4OH$ and HCl to form the equivalent of 0.343 molar ammonium acid manganese EDTA with the pH adjusted to 5.5 with HCl. Six of the contacts were for 24 hour duration and 2 were for 96 hours, all at 200° F.

The final catalyst analyzed 1.0 wt. percent Na, 2.75 wt. percent Mn, 17.8 wt. percent $Al_2O_3$, 76.2 wt. percent $SiO_2$, while the $SiO_2/Al_2O_3$ molar ratio was increased to 7.25/1.

Catalytic data presented in Table L show the particular catalytic advantages of the complex treatment which increased the $SiO_2/Al_2O_3$ ratio at the same time $Mn^{++}$ was exchanged into the structure. This catalyst was very active (65.9 vol percent conversion at 10 LHSV in the standard gas oil cracking test) and gave +12.9 vol. percent more $C_5$+gasoline advantage over standard Si/Al catalyst.

TABLE L.—MANGANESE-ACID ALUMINOSILICATE

Example No. _____ 27.
Description _____ High silica NaY; 6.3 $SiO_2/Al_2O_3$.

Base Exchange:
    Solution _____ 0.343 molar ammonium acid manganese EDTA.
    Contacts _____ 8 contacts at 200° F.

Composition:
    Na, wt. percent _____ 1.0.
    $Al_2O_3$, wt. percent _____ 17.8.
    $SiO_2$, wt. percent _____ 76.2.
    Mn, wt. percent _____ 2.75.
    $SiO_2/Al_2O_3$ molar ratio ____ 7.25/1.

Physical properties

Adsorption:
    Cyclohexane, wt. percent ____ 16.1.
X-ray analysis:
    Lattice constant $a_0$ (A.) _____ 24.61.

Catalytic evaluation

Conditions:
    LHSV _____ 10.
    C/O _____ 0.6
    Conv., vol. percent _____ 65.9.
    10 RVP gaso., vol. percent ___ 60.7.
    Excess $C_4$'s, vol. percent ____ 10.7.
    $C_5$+gasoline, vol. percent ___ 57.8.
    Total $C_4$'s, vol. percent _____ 13.6.
    Dry gas, wt. percent _____ 5.4.
    Coke, wt. percent _____ 0.86.
    $H_2$, wt. percent _____ 0.01.
Delta advantage over Si/Al:
    $C_5$+gasoline, vol. percent ___ +12.9.
    Total $C_4$'s, vol. percent _____ −4.4.
    Dry gas, wt. percent _____ −3.2.
    Coke, wt. percent _____ −4.8.

Examples 28–30

These examples were prepared to demonstrate the fact that the $SiO_2/Al_2O_3$ molar ratio could be increased considerably (11/1) with a complexing agent that removes alumina without seriously affecting the structure. The aluminosilicates thus prepared can then be exchanged with acidic salts such as $Al(NO_3)_3$, $Fe(NO_3)_3$ and $MnCl_2$ directly without severe effect on the structure. It appears that one can exchange the residual sodium from an EDTA treated aluminosilicate with $Al^{+++}$, $Fe^{+++}$ and $Mn^{++}$ to form aluminum aluminosilicates, ferric aluminosilicates and manganese aluminosilicates.

Example 28 was prepared by base exchanging 150 g. of the EDTA treated aluminosilicate for eight 2 hour contacts with a 2% $Al(NO_3)_3 \cdot 9H_2O$ solution At the end of this exchange this preparation had a residual Na content of 1.78 wt. percent and a cyclohexane adsorption of 12.9, substantiating the fact that the aluminosilicate retained most of its absorptive properties.

Example 29 was prepared in essentially the same manner as Example 28 except that the EDTA treated aluminosilicate was treated with a 2% $Fe(NO_2)_3 \cdot 9H_2O$. After the eight 2 hour contacts with 2% $Fe(NO_3)_3 \cdot 9H_2O$, the residual sodium content was 1.5 wt. percent, $Al_2O_3$ 11.9 wt. percent, $SiO_2$ 75.9 wt. percent, $Fe_2O_3$ 7.89 wt. percent, while the $SiO_2/Al_2O_3$ mole ratio was 10.1/1. Cyclohexane adsorption data show this catalyst to have 11.4 wt. percent adsorption.

In like manner, Example 30 was prepared base exchanging only with 2% $MnCl_2 \cdot 4H_2O$. Even though the residual sodium was decreased to 1.87, the cyclohexane data (18.5 wt. percent) show that the Mn exchange does not affect the adsorption properties of the EDTA treated aluminosilicate.

It is to be noted that by virtue of the present invention, cations which hydrolyze to form an acidic solution can be used readily and successfully to exchange the remaining residual sodium in the aluminosilicate. This results from the fact that as the $SiO_2/Al_2O_3$ ratio is increased, it becomes possible to exchange cations with more acidic solution. If the $SiO_2/Al_2O_3$ is increased sufficiently (viz., above about $7SiO_2/Al_2O_3$) it will be possible to make a wide variety of aluminosilicates since there aluminosilicates can be exchanged at low pH.

pared by the pre-exchange method followed by only $(NH_4)_2SO_4$ exchange in Example 36 and $CaCl_2$ exchange in Example 37. Both of these catalysts were active and very selective for gas oil cracking as shown in the standard gas oil cracking test at 4 LHSV.

TABLE M.—DURABEAD CATALYSTS PREPARED WITH THE EDTA TREATED NaY

| Example No. | 31 | 32 | 33 | 34 | 35 |
|---|---|---|---|---|---|
| Forming pH | 8.5 | 8.5 | 8.5 | 8.5 | 8.5 |
| Description: | | | | | |
| Matrix | Si/Al (94% $SiO_2$–6% $Al_2O_3$) | | | | |
| Fines: | | | | | |
| (1) Type | EDTA Treated NaY ($SiO_2/Al_2O_3$ 8.6/1) | | | | |
| Conc., wt. percent | 10 | 10 | 10 | 10 | 10 |
| (2) Type | McNamee Clay | | | | |
| Conc., wt. percent | 15 | 15 | 15 | 15 | 15 |
| Base Exchange: | | | | | |
| Solution | ¹$DiCl_3 \cdot 6H_2O$ | $NH_4Cl$ | $MnCl_2$ | $MgCl_2$ | $CaCl_2$ |
| Conc., wt. percent | (²) | 1 | 2 | 2 | 2 |
| Contacts | (²) | (³) | (³) | (³) | (³) |
| Composition: | | | | | |
| Na, wt. percent | 0.2 | 0.2 | 0.4 | 0.4 | 0.2 |
| $(RE)_2O_3$, wt. percent | 4.6 | | | | |
| Mn, wt. percent | | | 4.65 | | |
| Mg, wt. percent | | | | 3.6 | |
| Ca, wt. percent | | | | | 2.7 |
| Physical Properties of Treated Catalyst: | | | | | |
| Steamed Surface Area, m.²/g | 165 | 116 | 148 | 174 | 166 |
| Catalytic Evaluation: | | | | | |
| Conditions: | | | | | |
| LHSV | 4 | 4 | 4 | 4 | 4 |
| C/O | 1.5 | 1.5 | 1.5 | 1.5 | 1.5 |
| Conv., vol. percent | 67.3 | 53.7 | 58.6 | 63.2 | 62.0 |
| 10 RVP Gaso., vol. percent | 58.8 | 48.0 | 54.0 | 55.9 | 55.4 |
| Excess $C_4$'s, vol. percent | 12.2 | 9.4 | 8.6 | 11.5 | 9.9 |
| $C_5+$ Gasoline, vol. percent | 56.0 | 45.1 | 51.2 | 53.1 | 52.7 |
| Total $C_4$'s, vol. percent | 15.1 | 12.2 | 11.4 | 14.3 | 12.7 |
| Dry Gas, wt. percent | 6.8 | 5.2 | 4.8 | 5.7 | 6.0 |
| Coke, wt. percent | 1.53 | 0.9 | 1.5 | 1.8 | 1.4 |
| $H_2$, wt. percent | 0.04 | 0.04 | 0.06 | 0.04 | 0.03 |
| Delta Advantage Over Si/Al: | | | | | |
| 10 RVP Gaso., vol. percent | +10.8 | +6.9 | +10.3 | +9.9 | +9.9 |
| Excess $C_4$'s, vol. percent | −4.4 | −2.0 | −4.5 | −3.4 | −4.5 |
| $C_5+$ Gasoline, vol. percent | +10.0 | +6.1 | +9.5 | +9.1 | +9.3 |
| Total $C_4$'s, vol. percent | −3.3 | −1.4 | −3.7 | −2.6 | −3.7 |
| Dry Gas, wt. percent | −1.8 | −1.2 | −2.3 | −2.2 | −1.7 |
| Coke, wt. percent | −4.5 | −2.6 | −2.8 | −3.3 | −3.5 |

¹ $DiCl_3$, didymium chloride, is a mixture of rare earth chlorides having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths, 1–2% by weight.

² The run of Ex. 31 involved the contacting of the aluminosilicate with a 2% solution of $DiCl_3 \cdot 6H_2O$ for one 16 hour treatment followed by one 24 hour continuous treatment with 1% $NH_4Cl$. (Note: Where the contact of an aluminosilicate by a treating solution is indicated to be "continuous" or otherwise similarly designated, this refers to a flowing system equivalent to one-half volume of solution per volume of catalyst per hour.)

³ The runs of Exs. 32–35 involved continuous contacting of the aluminosilicate with a base exchange solution having the indicated concentration for one 24 hour period.

Examples 31–37

These examples, summarized in Tables M and N involve the treatment of Durabead-type catalyst materials prepared by incorporating in one series (Examples 31–35), 10 wt. percent of EDTA-treated NaY aluminosilicate (8.6/1 $SiO_2/Al_2O_3$) and, in the second series (Examples 36 and 37), the same NaY aluminosilicate after pre-exchanging with rare earth and ammonium chlorides.

The Durabead preparation is made by dispersing the aluminosilicate along with the McNamee clay in a silicate solution which is gelled with an acid alum solution to form a 94% $SiO_2$–6% $Al_2O_3$ matrix. These bead catalysts were formed at 8.5 pH and, immediately thereafter, base exchanged with didymium chloride followed by $NH_4Cl$ (Ex. 31), $NH_4Cl$ (Ex. 32), $MnCl_2$ (Ex. 33), Mg (Ex. 34) and Ca (Ex. 35). [Note: a more complete description of Durabead type catalysts may be found in Patent No. 2,900,349, whose disclosure is hereby incorporated by reference.]

As shown by the catalytic data (the standard gas oil cracking test at 4 LHSV after steaming) presented in Table M, all of these catalysts were very active and extremely selective.

Example 32 is an acid Y Durabead which is quite selective for having been exchanged only with $NH_4Cl$.

Data with respect to the catalysts of Examples 36 and 37 are presented in Table N. These catalysts were pre- TABLE N.—DURABEAD CATALYSTS PREPARED WITH THE RARE EARTH PRETREATED EDTA TREATED NaY

| Example No. | 36 | 37 |
|---|---|---|
| Forming pH | 8.5 | 8.5 |
| Description: | | |
| Matrix | Si/Al (94% $SiO_2$–6% $Al_2O_3$) | |
| Fines: | | |
| (1) Type | Rare Earth Exchanged EDTA Treated NaY | |
| Conc., wt. percent | 7 | 7 |
| (2) Type | McNamee Clay | |
| Conc., wt. percent | 18 | 18 |
| Base Exchange: | | |
| Solution | $(NH_4)_2SO_4$ | $CaCl_2$ |
| Conc., wt. percent | 1.4 | 2 |
| Contacts | 1–24 hour continuous | |
| Composition: | | |
| Na, wt. percent | 0.4 | 0.5 |
| $(RE)_2O_3$, wt. percent | 0.97 | |
| Ca, wt. percent | | 2.4 |
| Physical Properties: | | |
| App. Dens., g./cc | 0.83 | 0.74 |
| Surface Area, m.²/g., Steamed | 111 | 167 |
| Catalytic Evaluation: | | |
| Conditions: | | |
| LHSV | 4 | 4 |
| C/O | 1.5 | 1.5 |
| Conversion, vol. percent | 53.9 | 51.8 |
| 10 RVP Gaso., vol. percent | 48.7 | 47.8 |
| Excess $C_4$'s, vol. percent | 9.0 | 7.0 |
| $C_5+$ Gasoline, vol. percent | 46.4 | 45.2 |
| Total $C_4$'s, vol. percent | 11.3 | 9.7 |
| Dry Gas, wt. percent | 4.8 | 4.9 |
| Coke, wt. percent | 1.13 | 1.13 |
| $H_2$, wt. percent | 0.04 | 0.04 |
| Delta Advantage Over Si/Al: | | |
| $C_5+$ Gasoline, vol. percent | +7.9 | +7.8 |
| Total $C_4$'s, vol. percent | −2.7 | −3.7 |
| Dry Gas, wt. percent | −1.8 | −1.4 |
| Coke, wt. percent | −2.4 | −2.1 |

Examples 38 and 39

Still another approach made was to take advantage of the catalytic improvement possible with the complexing agent effect on catalysts. Here Durabead catalysts containing 10% high silica NaY aluminosilicate (6.25 $SiO_2$/$Al_2O_3$) with 15 wt. percent McNamee clay for diffusivity in a 94% $SiO_2$–6% $Al_2O_3$ matrix were treated with EDTA first and then base exchanged with $(NH_4)_2SO_4$ in Example 38 and with 2% $RECl_3 \cdot 6H_2O$ for one 16 hour treatment followed with $(NH_4)_2SO_4$ in Example 39.

Catalytic data presented in Table O clearly show the advantages in selectivity resulting from pretreating the hydrogel with EDTA in a prewashing before base exchange.

TABLE O.—DURABEAD CATALYST CONTAINING NaY TREATED WITH EDTA

| Example No. | 38 | 39 |
|---|---|---|
| Forming pH | 8.5 | 8.5 |
| Description: | | |
| Matrix | Si/Al (94% $SiO_2$–6% $Al_2O_3$) | |
| Fines: | | |
| (1) Type | NaY (6.25 $SiO_2$/$Al_2O_3$) | |
| Conc., wt percent | 10 | 10 |
| (2) Type | McNamee Clay | |
| Conc., wt. percent | 15 | 15 |
| Base Exchange | (1) | (1) |
| Solution | $(NH_4)_2SO_4$ | $RECl_3 \cdot 6H_2O \rightarrow (NH_4)_2SO_4$ |
| Conc., wt. percent | 1–24 hr. cont. | 1–16 hr. cont. 1–24 hr. cont. |
| Composition: | | |
| Na, wt. percent | 0.3 | 0.3 |
| $(RE)_2O_3$, wt. percent | | 1.13 |
| Physical Properties: | | |
| App. Dens. g./cc | 0.81 | 0.82 |
| Surface Area, m.²/g., Steamed | 98 | 121 |
| Catalytic Evaluation: | | |
| Conditions: | | |
| LHSV | 4 | 4 |
| C/O | 1.5 | 1.5 |
| Conversion, vol. percent | 52.5 | 61.8 |
| 10 RVP Gaso., vol. percent | 45.4 | 55.2 |
| Excess $C_4$'s, vol. percent | 10.6 | 10.8 |
| $C_5$+ Gasoline, vol. percent | 43.2 | 52.4 |
| Total $C_4$'s, vol. percent | 12.8 | 13.7 |
| Dry Gas, wt. percent | 5.3 | 5.6 |
| Coke, wt. percent | 1.4 | 1.4 |
| $H_2$, wt. percent | 0.05 | 0.04 |
| Delta Advantage Over Si/Al: | | |
| 10 RVP, Gaso., vol. percent | +4.9 | +9.9 |
| Excess $C_4$'s, vol. percent | −0.4 | −3.5 |
| $C_5$+ Gasoline, vol. percent | +4.7 | +9.2 |
| Total $C_4$'s, vol. percent | −0.4 | −2.6 |
| Dry Gas, wt. percent | −0.9 | −2.1 |
| Coke, wt. percent | −1.9 | −2.1 |

¹ Durabead hydrogel was treated 24 hours with 44 g. EDTA per 3 liter of hydrogel before base exchange.

Example 40

This example illustrates the applicability of the process of the present invention to still other aluminosilicates.

Example 40 was prepared by treating synthetic chabazite with EDTA in the same manner as described before. The starting chabazite was prepared through the caustic-silicate fusion method. This method is carried out by reaction of 50 g. raw Dixie clay, a kaolinite, 81.7 g. NaOH, 536.0 g. "N" brand silicate (28.5% $SiO_2$, 8.9% $Na_2O$, 62.6% $H_2O$) and 50 cc. $H_2O$ for 4 hours at 600° F. The resulting crusty solid was pulverized, then contacted first with 250 cc. $H_2O$ and then with 2628 cc. of $H_2O$ and digested for 21 hours at 200° F. The resulting crystalline material was separated from the supernatant liquid by filtering and washing. The starting composition was 9.9 wt. percent Na, 22.7 wt. percent $Al_2O_3$ and 63.3 wt. percent $SiO_2$ and a starting $SiO_2$/$Al_2O_3$ mole ratio of 4.75/1. The cyclohexane adsorption was 0.8 wt. percent and water adsorption 12.8 wt. percent.

One-half pound of the synthetic chabazite was treated 4 times at 200° F. with 20 g. EDTA in 200 cc. water. Three of the contacts were for 24 hour duration while one was for 72 hour duration.

The treated chabazite had the following composition: 5.4 wt. percent Na, 17.0 wt. percent $Al_2O_3$, and 75.1 wt. percent $SiO_2$. The $SiO_2$/$Al_2O_3$ mole ratio was increased to 7.5/1 by the EDTA chelation. The final treated chabazite had 5.8 wt. percent cyclohexane, 6.2 wt. percent normal hexane, and 16.8 wt. percent $H_2O$ adsorption, suggesting that the chabazite was activated to have superior adsorptive properties.

In an earlier part of this specification, it was mentioned that disodium dihydrogen EDTA was ineffective to remove alumina from sodium zeolite Y due to the weak acid nature of the disodium dihydrogen EDTA. On the other hand, in Example 1, it was shown that the same chelating agent was effective to remove alumina from calcium zeolite Y, due to the highly stable calcium chelate which was formed and which provided the potential to cause the chelation reaction to take place. In Example 41, it will be shown that zeolites such as sodium zeolite Y can also be made alumina-deficient by treating with disodium dihydrogen EDTA providing the zeolite is given a preliminary acidification and solvolysis treatment.

Example 41

Samples of a sodium zeolite Y were exchanged with increasing amounts of $NH_4^+$ ion and then calcined to give a series of sodium hydrogen zeolites in which the percent of hydrogen in cation sites varied from 40 to 68%. These materials were first contacted with water at room temperature overnight and then treated for 30–60 minutes with a solution of disodium dihydrogen EDTA. The products from these reactions were then analyzed for silica, alumina and sodium oxide. The results are summarized.

| Percent equivalents, H initially in cation sites: | Percent equivalents, Al removed |
|---|---|
| 41 | 10 |
| 43 | 9 |
| 49 | 11 |
| 54 | 15 |
| 60 | 18 |
| 67 | 21 |
| 68 | 24 |

As will be seen from the above, not only was aluminum chelated from the zeolite, but this test demonstrates that as the number of cation sites occupied by hydrogen is increased, the amount of aluminum removed by solvolysis (in this case, hydrolysis) from tetrahedral sites is also increased.

Earlier in the present specification, it was pointed out that an extremely effective method of carrying out the present invention involved the use of sequestering agents which formed soluble complexes, which complexes could be readily removed from the solid alumina-deficient aluminosilicate by a simple filtration technique. It was also noted, however, that an alternative procedure contemplated the use of chelating materials which did not form soluble complexes but which nevertheless could be effectively separated from the alumina-deficient aluminosilicate. Such a technique is set forth in the following example:

Example 42

Dowex ion exchange resin A-1 was used in this experiment. This material consists of a copolymer of styrene and 8% divinylbenzene. The functional group, an iminodiacetate

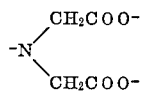

is located on aromatic rings and imparts to the resin chelating properties similar to those of ethylenediaminetetraacetate. For example, the selectivity of the resin for $Cu^{++}$ versus $Na^+$ is about 100 to 1.

Approximately 20 g. of a synthetic faujasite, essentially in the calcium form, was slurried at room temperature for three days with 250 ml. of the chelating resin in the hydrogen form. The reaction product was separated from the resin beads by means of a U.S. Standard Sieve No. 100. The finely divided inorganic product was readily washed through the sieve while the beads were retained. The slurry of product and water which had passed through the sieve were filtered and the residue on the filter washed with water. The following summary of the properties of the initial zeolite and the product clearly shows the removal of aluminum from the zeolite:

|  | Initial Zeolite | Product |
|---|---|---|
| Wt. percent: | | |
| $Na_2O$ | 2.6 | 2.2 |
| CaO | 8.9 | 5.2 |
| $Al_2O_3$ | 21.7 | 18.5 |
| $SiO_2$ | 67.9 | 72.8 |
| Mol percent: | | |
| $Na_2O$ | 2.7 | 2.2 |
| CaO | 10.3 | 6.1 |
| $Al_2O_3$ | 13.8 | 11.9 |
| $SiO_2$ | 73.3 | 79.5 |
| Molar Ratio $SiO_2/Al_2O_3$ | 5.3 | 6.6 |
| Cyclohexane sorbed, g./g. sample | 0.185 | 0.193 |

In carrying out the process of the present invention, care must be taken to avoid excessive treatment with the complexing agent to a point such that the crystallinity of the aluminosilicate is essentially destroyed (viz, the point at which the loss in crystallinity exceeds 50%). As will be apparent, the point at which this will take place will necessarily vary depending upon the aluminosilicate treated and the nature of the complexing agent, though such point may be readily determined in a given case by conventional techniques.

In the foregoing portion of the specification, a novel technique for increasing the silica/alumina ratio of crystalline aluminosilicates has been set forth. It is to be understood, however, that the practice of the present invention is also applicable to isomorphs of said crystalline aluminosilicates. For example, the aluminum may be replaced by elements such as gallium and silicon by elements such as germanium.

While various theories have been postulated in earlier portions of the instant specification for purposes of explaining the various inventive concepts heretofore described, it will be understood that such theories merely represent the present understanding of the inventors as to the phenomena involved and that the appended claims are not to be limited by such theories unless otherwise indicated.

The catalysts prepared in accordance with the present invention find extensive utility particularly for transforming organic compounds which are catalytically convertible in the presence of acidic catalyst sites into modified organics. For example, they are useful in a wide variety of hydrocarbon conversion processes including isomerization, dealkylation, alkylation, disproportionation, hydration of olefins, amination of olefins, hydrocarbon oxidation, dehydrogenation, dehydration of alcohols, desulfurization, hydrogenation, hydroforming, reforming, cracking, hydrocracking, oxidation, polymerization, aromatization and the like. The catalysts are exceptionally stable and are particularly useful in such of the above and related processes carried out at temperatures ranging from ambient temperatures of 70° F. up to 1400° F., including such processes in which the catalyst is periodically regenerated by burning off combustible deposits. Because of their high catalytic activities, the catalysts are especially useful for effecting various hydrocarbon conversion processes such as alkylation, for example, at relatively low temperatures with small amounts of catalyst, thus providing a minimum of undesirable side reactions and operating costs.

By way of example, the dehydrogenation of hydrocarbons such as propane, butylene, butane, pentane, cyclopentane, cyclohexane, methyl cyclohexane and the like, can be carried out at temperatures ranging from about 300° F. to 1025° F. under atmospheric or superatmospheric pressures with a space velocity (LHSV) from 0.2 to 5000. For dehydrogenation, metals and oxides and sulfides of metals such as platinum, palladium, rhodium, tungsten, iron, copper or nickel can be employed as promoters with the active aluminosilicate.

For the desulfurization of hydrocarbons, which involves largely hydrogenation, the oxides and sulfides of such metals as cobalt, molybdenum, tungsten, chromium, iron, manganese, vanadium, copper and mixtures thereof as well as platinum group metals may be used in conjunction with the aluminosilicate. Desulfurization of shale distillates and the like may be carried out at temperatures between about 600° F. and 1000° F. under atmospheric or superatmospheric pressures with a space velocity (LHSV) between 0.2 and 50. The specific conditions within these ranges will vary with the feed stock undergoing desulfurization and the product desired.

The catalysts of the invention can be employed for hydrogenation of unsaturated aliphatic hydrocarbons, such as mono-olefins, diolefins, and the like, to form the corresponding saturated hydrocarbons, hydrogenation of unsaturated cyclic hydrocarbons, and hydrogenation of unsaturated alcohols, ketones, acids, etc. For hydrogenation reactions, the temperature may range up to 1000° F. under a pressure of about 10 to 3000 pounds or more, at a space velocity (LHSV) from about 0.5 to 5.0. The promoters which are normally employed with the aluminosilicate include the oxides of nickel, copper and iron and platinum group metals.

Hydrocracking of heavy petroleum residual stocks, cycle stocks, etc., may be carried out with active aluminosilicates promoted with about 0.05 to 10% by weight of a platinum metal such as platinum, palladium, rhodium, osmium, iridium, and ruthenium or with oxides or sulfides of metals such as cobalt, molybdenum, tungsten, chromium, iron, copper and the like. The petroleum feed stock is cracked in the presence of the catalyst at temperatures between 400° F. and 825° F. using molar ratios of hydrogen to hydrocarbon charge in a range between 2 and 80. The pressure employed will vary between 10 and 2500 p.s.i.g. and the space velocity between 0.1 and 10.

The catalysts of the invention may be further utilized for the alkylation of aromatic hydrocarbons or phenols and the conversion of olefinic, acetylenic and naphthenic hydrocarbons. Alkylation of aromatics and phenols may be carried out at temperatures between 15° and 850° F. under pressures of 0 to 1000 p.s.i.g. The aromatizing reaction may be effected at temperatures between 350° F. and 1100° F. under atmospheric or elevated pressures. Other reactions in which the catalysts find utility include isomerization, polymerization, hydrogen transfer, oxidation of olefins to form the corresponding oxides (such as ethylene to ethylene oxide, propylene to propylene oxide, etc.), as well as the oxidation of alcohols and ketones. The catalyst composition of the invention also finds utility in processes for the oxidation of cyclohexane to adipic acid through the precursors cyclohexanone and cyclohexanol, as well as in the manufacture of caprolactam from caprolactone and ammonia. Additionally, the catalyst composites of the invention may be useful catalytically in processes for the production of vinyl chloride by oxidative-dehydrogenation reactions involving ethane and hydrogen chloride.

[Note: When used in the claims, the description of a treatment being effected "within the acceptable region of the drawing" shall be construed to mean that the silica/alumina ratio of the original crystalline aluminosilicate, when plotted against the weight percent alumina removed from said original aluminosilicate, presents a point falling between curves A and B in the drawing and thus in the area designated "acceptable region." When used in the claims, the reference to an aluminosilicate as being in "hydrogen form" shall be construed to mean that at least a portion of the cations of the aluminosilicate are hydrogen ions.]

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of increasing the silica/alumina ratio of a crystalline aluminosilicate comprising exposing said aluminosilicate to hydrolysis while the latter is at least partially in its hydrogen form so as to remove aluminum atoms from the crystal lattice of said aluminosilicate, said hydrolysis treatment being effected within the acceptable region of the drawing and resulting in a product which retains at least 50% of the crystallinity of said aluminosilicate, and physically removing at least a portion of said aluminum atoms from said aluminosilicate.

2. A method as defined in claim 1 wherein said hydrolysis treatment, while effecting removal of aluminum atoms from tetrahedral sites in said aluminosilicate, does not effect physical separation of said aluminum atoms from said aluminosilicate and wherein said aluminosilicate is subsequently treated to effect such physical separation.

3. A method as defined in claim 2 wherein said subsequent treatment comprises treating said aluminosilicate with a substance which will combine with aluminum which has been removed from said tetrahedral sites to cause physical separation of said aluminum from said aluminosilicate.

4. A method of increasing the silica/alumina ratio of a crystalline aluminosilicate comprising exposing said aluminosilicate to solvolysis while the latter is at least partially in its hydrogen form so as to remove aluminum atoms from the crystal lattice of said aluminosilicate, said solvolysis treatment being effected within the acceptable region of the drawing and resulting in a product which retains at least 50% of the crystallinity of said aluminosilicate, said solvolysis treatment while effecting removal of aluminum atoms from tetrahedral sites in said aluminosilicate not effecting physical separation of said aluminum atoms from said aluminosilicate, and subsequently treating said aluminosilicate with a chelating agent which will form a stable chelate with at least a portion of the aluminum which has been removed from said tetrahedral sites to cause physical separation of said aluminum from said aluminosilicate.

5. A process as defined in claim 4 wherein said chelating agent forms a soluble chelate with aluminum in the medium in which said chelation is effected, said aluminosilicate being insoluble in said medium both before and after chelation.

6. A process as defined in claim 5 wherein said chelating agent forms a chelate with at least one cation in said aluminosilicate which chelate is soluble in the medium in which said chelation is effected.

7. A process as defined in claim 1 wherein said portion of said aluminum atoms is physically removd from said aluminosilicate by a chelating agent which will form a stable chelate with aluminum and wherein said chelating agent is also employed to convert said aluminosilicate at least partially to its hydrogen form prior to the hydrolysis step.

8. A process as defined in claim 7 wherein said chelating agent is selected from the group consisting of ethylenediaminetetraacetic acid, carboxylic acids, polycarboxylic acids, acid salts of said acids and mixtures thereof.

9. A process as defined in claim 7 wherein said chelating agent is di (tetraethylammonium) dihydrogen ethylenediaminetetraacetic acid.

10. A process as defined in claim 9 wherein said aluminosilicate is in the faujasite form before the hydrolysis step.

11. A process as defined in claim 9 wherein said aluminosilicate is in the Y form before the hydrolysis step.

12. A process as defined in claim 11 wherein said aluminosilicate is in the calcium Y form before the hydrolysis step.

13. A process as defined in claim 7 wherein said chelating agent is only weakly acid and wherein said aluminosilicate contains cations prior to the hydrolysis step which form sufficiently stable chelates with said chelating agent to provide the reaction potential to cause hydrogen ions in the chelating agent to exchange into cation sites in said aluminosilicate.

14. A process as defined in claim 4 wherein said chelating agent forms a stable chelate with said aluminum which is insoluble in the medium in which the chelation is effected.

15. A process as defined in claim 14 wherein said chelating agent is an anion exchange resin which will form a stable chelate with aluminum and which, after chelation of said aluminum from said aluminosilicate, will be of a size sufficiently different from that of the alumina-deficient aluminosilicate to be separated therefrom by a classification technique.

16. A process as defined in claim 4 wherein said chelating agent forms a stable chelate with at least one cation in said aluminosilicate.

17. A process as defined in claim 4 wherein the pH of the hydrolysis reaction mixture is below about 7 at at least some point during the hydrolysis reaction.

18. A process as defined in claim 4 wherein the pH of said chelating agent is no greater than about 6.

19. A method of increasing the silica/alumina ratio in a crystalline aluminosilicate lattice comprising converting said aluminosilicate at least partially to the hydrogen form, hydrolyzing said converted aluminosilicate so as to remove aluminum atoms from the crystal lattice of said aluminosilicate, said hydrolysis treatment being effected within the acceptable region of the drawing and resulting in a product which retains at least 50% of the crystallinity of said aluminosilicate, and physically removing at least a portion of said aluminum atoms from said aluminosilicate.

20. A method as defined in claim 19 wherein the silica/alumina ratio in the initial aluminosilicate is at least about 4/1.

21. A crystalline aluminosilicate characterized by an X-ray diffraction pattern which indicates by conventional interpretation the presence of silicon not actually present in said aluminosilicate, said aluminosilicate being alumina-deficient as compared with the aluminosilicate from which it was made, both said aluminosilicate and said aluminosilicate from which it was made having the same quantity of silica per unit cell.

22. A crystalline aluminosilicate characterized by an X-ray diffraction pattern which indicates by conventional interpretation the presence of silicon not actually present in said aluminosilicate, said aluminosilicate being alumina-deficient as compared with the aluminosilicate from which it was made and having at least 50% of its crystallinity, both said aluminosilicate and said aluminosilicate from which it was made having the same quantity of silica per unit cell.

23. A method of increasing the silica/alumina ratio in a crystalline aluminosilicate comprising treating said aluminosilicate with a fluid medium containing a chelating agent which forms stable chelates with aluminum, said treatment being carried out so as to convert at least a portion of the aluminum of said aluminosilicate to said stable aluminum chelate, said aluminosilicate being at least partially in its hydrogen form prior to the conversion of said aluminum to said stable aluminum chelate.

24. A method as defined in claim 23 wherein said chelating agent contains a hydrogen atom and at least one cation other than hydrogen and wherein said cation is too large to be exchanged into said aluminosilicate to any substantial extent.

25. A method as defined in claim 23 wherein the silica/alumina ratio of the aluminosilicate before said treatment is less than about 6/1.

26. A process for altering the properties of a crystalline aluminosilicate with a change in chemical composition of the ordered anionic structure while substantially retaining crystallographic character as indicated by X-ray diffraction pattern which comprises sufficiently treating said aluminosilicate with a fluid medium containing a chelating agent for aluminum ions to remove aluminum from the crystal lattice of said aluminosilicate, said aluminosilicate being at least partially in its hydrogen form prior to the conversion of said portion of said aluminum to said stable aluminum chelate, leaving a crystal structure which appears by X-ray diffraction to contain silicon atoms which are not actually present.

27. A crystalline aluminosilicate having the crystallographic structure of faujasite but having a silica/alumina ratio of greater than about 6/1.

28. A crystalline aluminosilicate having the crystallographic structure of zeolite L but having a silica/alumina ratio of greater than about 7/1.

29. A crystalline aluminosilicate having the crystallographic structure of chabazite but having a silica/alumina ratio of greater than about 5/1.

30. A porous crystalline aluminosilicate having a silica/alumina ratio greater than about 10/1.

31. A porous crystalline aluminosilicate having channels larger than 4 A. in at least two dimensions and a silica/alumina ratio greater than about 6/1.

32. A method of increasing the silica/alumina ratio of a crystalline aluminosilicate having a silica/alumina ratio of less than about 6/1 comprising exposing said aluminosilicate to hydrolysis while the latter is at least partially in its hydrogen form so as to remove aluminum atoms from the crystal lattice of said alumino silicate and physically removing at least a portion of said aluminum atoms from said aluminosilicate.

33. A crystalline aluminosilicate characterized by a hydrocarbon adsorption capacity greater than would be theoretically calculated from a combined X-ray diffraction and elemental chemical analysis of said crystalline aluminosilicate.

34. A method of increasing the silica/alumina ratio of a crystalline aluminosilicate comprising converting said aluminosilicate at least partially to the hydrogen form, the material used to treat said aluminosilicate so as to convert it to the hydrogen form having a pH of greater than 4 when the silica/alumina ratio of said aluminosilicate is less than 3/1 and a pH of greater than 3 when the silica/alumina ratio of said aluminosilicate is at least 3/1, hydrolyzing said converted aluminosilicate so as to remove aluminum atoms from the crystal lattice of said aluminosilicate, said hydrolysis treatment being effected so that the treated aluminosilicate retains at least 50% of the crystallinity of the original aluminosilicate, and physically removing at least a portion of said aluminum atoms from said aluminosilicate.

35. A method as defined in claim 34 wherein said hydrolysis treatment is effected within the acceptable region of the drawing.

36. A method of increasing the silica/alumina ratio of a crystalline aluminosilicate comprising converting said aluminosilicate at least partially to the hydrogen form, hydrolyzing said converted aluminosilicate so as to remove aluminum atoms from the crystal lattice of said aluminosilicate and physically removing at least a portion of said aluminum atoms from said aluminosilicate, the hydrolysis step taking place subsequently in point of time to the conversion of said aluminosilicate at least partially to the hydrogen form.

37. A method as defined in claim 36 wherein said hydrolysis treatment is effected within the acceptable region of the drawing and results in a product which retains at least 50% of the crystallinity of the original aluminosilicate.

38. A method of increasing the silica/alumina ratio of a composition selected from the group consisting of porous crystalline aluminosilicates and isomorphs thereof comprising exposing said composition to hydrolysis while the latter is at least partially in its hydrogen form so as to remove aluminum atoms from the crystal lattice of said composition, said hydrolysis treatment being effected within the acceptable region of the drawing and resulting in a product which retains at least 50% of the crystallinity of said composition, and physically removing at least a portion of said aluminum atoms from said composition.

39. A composition selected from the group consisting of porous crystalline aluminosilicates and isomorphs thereof characterized by an X-ray diffraction pattern which indicates by conventional interpretation the presence of silicon or its counterpart in said isomorph not actually present in said composition, said composition being alumina-deficient as compared with the composition from which it was made, both said composition and said composition from which it was made having the same quantity of silica per unit cell.

40. A composition selected from the group consisting of porous crystalline aluminosilicates and isomorphs thereof characterized by a hydrocarbon adsorption capacity greater than would be theoretically calculated from a combined X-ray diffraction and elemental chemical analysis of said composition.

41. In a cracking process in which a hydrocarbon is cracked in the presence of a catalyst under cracking conditions, the improvement comprising carrying out said process in the presence of a catalyst as defined in claim 21.

42. A cracking process as defined in claim 41 wherein said cracking process is a hydrocracking process carried out in the presence of hydrogen and wherein said catalyst contains a hydrocracking promoter component.

43. In a cracking process in which a hydrocarbon is cracked in the presence of a catalyst under cracking conditions, the improvement comprising carrying out said process in the presence of a catalyst as defined in claim 22.

44. A cracking process as defined in claim 43 wherein said cracking process is a hydrocracking process carried out in the presence of hydrogen and wherein said catalyst contains a hydrocracking promoter component.

45. In a cracking process in which a hydrocarbon is cracked in the presence of a catalyst under cracking conditions, the improvement comprising carrying out said process in the presence of a catalyst as defined in claim 40.

46. A cracking process as defined in claim 45 wherein said cracking process is a hydrocracking process carried out in the presence of hydrogen and wherein said catalyst contains a hydrocracking promoter component.

References Cited

UNITED STATES PATENTS

| | | | |
|---|---|---|---|
| 2,431,206 | 11/1947 | Spicer et al. | 208—120 |
| 2,971,904 | 2/1961 | Gladrow et al. | 208—135 |
| 3,140,249 | 7/1964 | Plank et al. | 208—120 |
| 3,130,006 | 4/1964 | Rabo et al. | 23—110 |
| 3,168,462 | 2/1965 | Erickson | 208—120 |
| 3,236,762 | 2/1966 | Rabo et al. | 208—111 |

DELBERT E. GANTZ, *Primary Examiner.*

T. H. YOUNG, *Assistant Examiner.*

U.S. Cl. X.R.

252—455

UNITED STATES PATENT OFFICE
CERTIFICATE OF CORRECTION

Patent No. 3,442,795                                                       May 6, 1969

George T. Kerr et al.

It is certified that error appears in the above identified patent and that said Letters Patent are hereby corrected as shown below:

Column 3, line 42, that portion of the formula reading "$(SiO)_x$" should read -- $(SiO_2)_x$ --. Column 7, line 1, "way" should read -- may --. Column 9, line 30, "qlutaric" should read -- glutaric --; line 66, "anothre" should read -- another --; line 75, "crabonate" should read -- carbonate --. Column 12, line 26, "6 to 6" should read -- 0 to 6 --. Column 17, TABLE B, third column, line 4 thereof, "52.66" should read -- 52.6 --. Column 18, lines 61 and 62, "Patent 598,528" should read -- Patent 598,582 --. Column 20, TABLE E′, sixth column, last line thereof, "24.46" should read -- 24.60 --; same table, sixth column, opposite "Relative Crystallinity", insert -- 44 --. Column 28, line 58, "$Fe(NO_2)_3$" should read -- $Fe(NO_3)_3$ --; line 62, "10.1/1" should read -- 10.8/1 --.

Signed and sealed this 31st day of March 1970.

(SEAL)
Attest:

EDWARD M. FLETCHER, JR.                                WILLIAM E. SCHUYLER, JR.
Attesting Officer                                             Commissioner of Patents